US012595078B2

(12) United States Patent
Fischer

(10) Patent No.: US 12,595,078 B2
(45) Date of Patent: Apr. 7, 2026

(54) AEROSPACE VEHICLES

(71) Applicant: Addison M. Fischer, Naples, FL (US)

(72) Inventor: Addison M. Fischer, Naples, FL (US)

( * ) Notice: Subject to any disclaimer, the term of this patent is extended or adjusted under 35 U.S.C. 154(b) by 26 days.

(21) Appl. No.: 18/535,981

(22) Filed: Dec. 11, 2023

(65) Prior Publication Data

US 2024/0400230 A1    Dec. 5, 2024

Related U.S. Application Data

(63) Continuation of application No. 18/136,741, filed on Apr. 19, 2023, now abandoned, which is a continuation of application No. 17/892,837, filed on Aug. 22, 2022, now abandoned, which is a continuation of application No. 17/567,776, filed on Jan. 3, 2022, now abandoned, which is a continuation of application No. 17/323,684, filed on May 18, 2021, now abandoned, which is a continuation of application No. 17/152,296, filed on Jan. 19, 2021, now abandoned.

(60) Provisional application No. 63/074,887, filed on Sep. 4, 2020, provisional application No. 62/985,841, filed on Mar. 5, 2020, provisional application No. 62/962,658, filed on Jan. 17, 2020.

(51) Int. Cl.
| | |
|---|---|
| *B64G 1/14* | (2006.01) |
| *B64G 1/24* | (2006.01) |
| *B64G 1/40* | (2006.01) |

(52) U.S. Cl.
CPC .............. *B64G 1/14* (2013.01); *B64G 1/244* (2019.05); *B64G 1/402* (2013.01)

(58) Field of Classification Search
CPC .......... B64G 1/14; B64G 1/244; B64G 1/402; B64G 1/4026; B64G 1/409
See application file for complete search history.

(56) References Cited

U.S. PATENT DOCUMENTS

| | | | | | |
|---|---|---|---|---|---|
| 5,279,484 | A | * | 1/1994 | Zimmermann | .......... B64G 1/12 |
| | | | | | 244/171.1 |
| 5,927,653 | A | * | 7/1999 | Mueller | ................. B64G 1/623 |
| | | | | | 244/164 |
| 6,113,035 | A | * | 9/2000 | Hubert | ................... B64G 1/285 |
| | | | | | 701/13 |
| 10,844,483 | B1 | * | 11/2020 | Nagel | ................... B01J 19/0093 |
| 11,505,459 | B1 | * | 11/2022 | Nagel | ........................ C01B 3/24 |
| 2010/0257839 | A1 | * | 10/2010 | Watkins | ................. B64G 1/402 |
| | | | | | 60/204 |
| 2016/0101398 | A1 | * | 4/2016 | Worsley | ............... B01J 13/0091 |
| | | | | | 427/372.2 |
| 2018/0022439 | A1 | * | 1/2018 | Stanley | .................... B64G 1/58 |
| | | | | | 244/171.7 |
| 2018/0354659 | A1 | * | 12/2018 | Baldwin | ................ B64G 1/402 |
| 2019/0256229 | A1 | * | 8/2019 | Griffin | ..................... B64G 1/10 |
| 2020/0325820 | A1 | * | 10/2020 | Wang | ...................... B64C 23/04 |

* cited by examiner

*Primary Examiner* — Rodney A Bonnette
(74) *Attorney, Agent, or Firm* — Nixon & Vanderhye PC

(57) ABSTRACT

A long range vehicle capable of space travel uses quantum effects such as quantum printing or instantiation to produce consumables during travel. The long range vehicle comprises a transport shell, a propulsor disposed in or on the shell, and at least one Nagel Quantum Effect Device (NQED) operatively coupled to the propulsor, the at least one NQED providing imprinted material to the propulsor.

22 Claims, 12 Drawing Sheets

RIGHT

AFT

LEFT

FORE

AEROSPACE VEHICLES

CROSS-REFERENCES TO RELATED APPLICATIONS

The present application is a continuation of application Ser. No. 18/136,741 filed Apr. 19, 2023; which is a continuation of application Ser. No. 17/892,837, filed Aug. 22, 2022; which is a continuation of application Ser. No. 17/567, 776, filed Jan. 3, 2022; which is a continuation of application Ser. No. 17/323,684, filed May 18, 2021; which is a continuation of application Ser. No. 17/152,296 filed Jan. 19, 2021; which is related to and claims priority from the following THREE prior filed applications, each incorporated herein by reference for all purposes:

(1) U.S. Patent Application No. 62/962,658 filed Jan. 17, 2020 entitled LONG RANGE VEHICLE.

(2) U.S. Patent Application No. 62/985,841 filed Mar. 5, 2020 entitled LONG RANGE VEHICLE.

(3) U.S. Patent Application No. 63/074,887 filed Sep. 4, 2020 entitled AEROSPACE VEHICLE.

This application is related to the following patent applications each of which is incorporated herein by reference for all purposes as if expressly set forth herein:

application Nos. 62/980,110 filed Feb. 21, 2020 and 62/957,266 filed Jan. 5, 2020, each entitled "Quantum Independent Breathing Apparatus Quiba";

application Ser. Nos. 17/141,921 and 17/141,875 each filed 5 Jan. 2021, application Ser. No. 17/320,816 filed May 14, 2021, application Ser. No. 17/672,193 filed Feb. 15, 2022, application Ser. No. 17/950,543 filed Sep. 22, 2022, and application Ser. No. 18/144,794 filed May 8, 2023, each entitled "Quantum Production And Supply Of One Or More Breathing Or Other Substances To An Organism"

WO2023167662A1 published 2023 Sep. 7

WO2023167663A1 published 2023 Sep. 7

WO2023167664A1 published 2023 Sep. 7

WO2023167665A1 published 2023 Sep. 7.

FIELD

The technology herein relates to aerospace vehicles, and more particularly to constructing a long range space vehicle capable of interplanetary or interstellar travel, and to constructing a propulsion system for such vehicles that uses as propellant, material instantiated, or quantum printed, using Nagel Quantum Effects. The technology herein also relates to a flying craft capable of matching or exceeding the performance of a helicopter in speed, altitude, maneuverability, and realm of operation—inasmuch as it can operate in the atmosphere as well as airless "space" [i.e., within as well as beyond the atmosphere]. Various embodiments can be appropriately equipped to be considered aircraft, spacecraft or both.

BACKGROUND & SUMMARY

Long distance space travel has previously been the subject of science fiction. To make it a reality, the problem of how to supply sufficient fuel, air, and heat for a long distance journey must be solved.

Figure 1A:
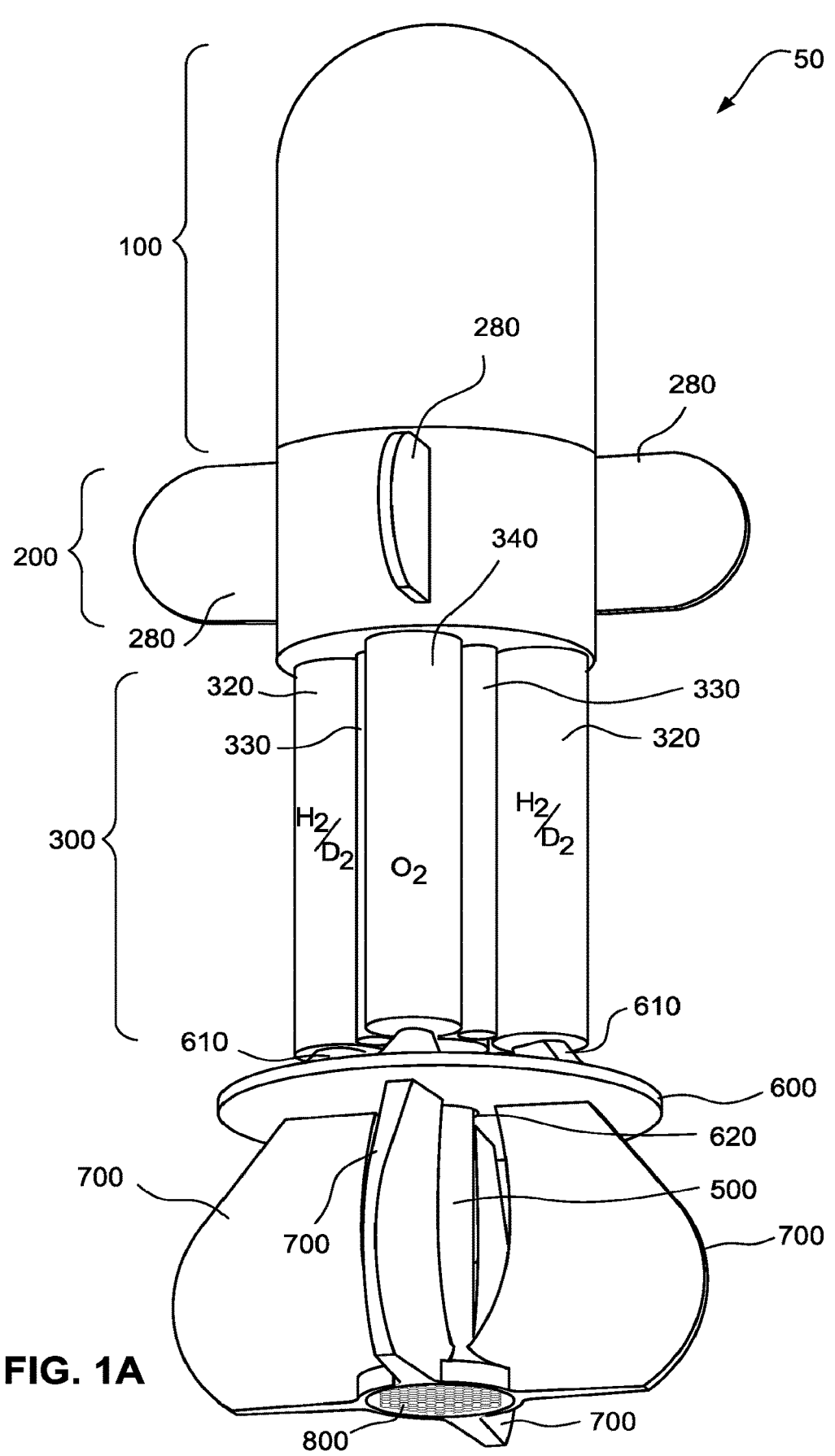
FIG. 1A showing an ascending elevation of the example embodiment #1 of a long range vehicle.
Figure 1B:
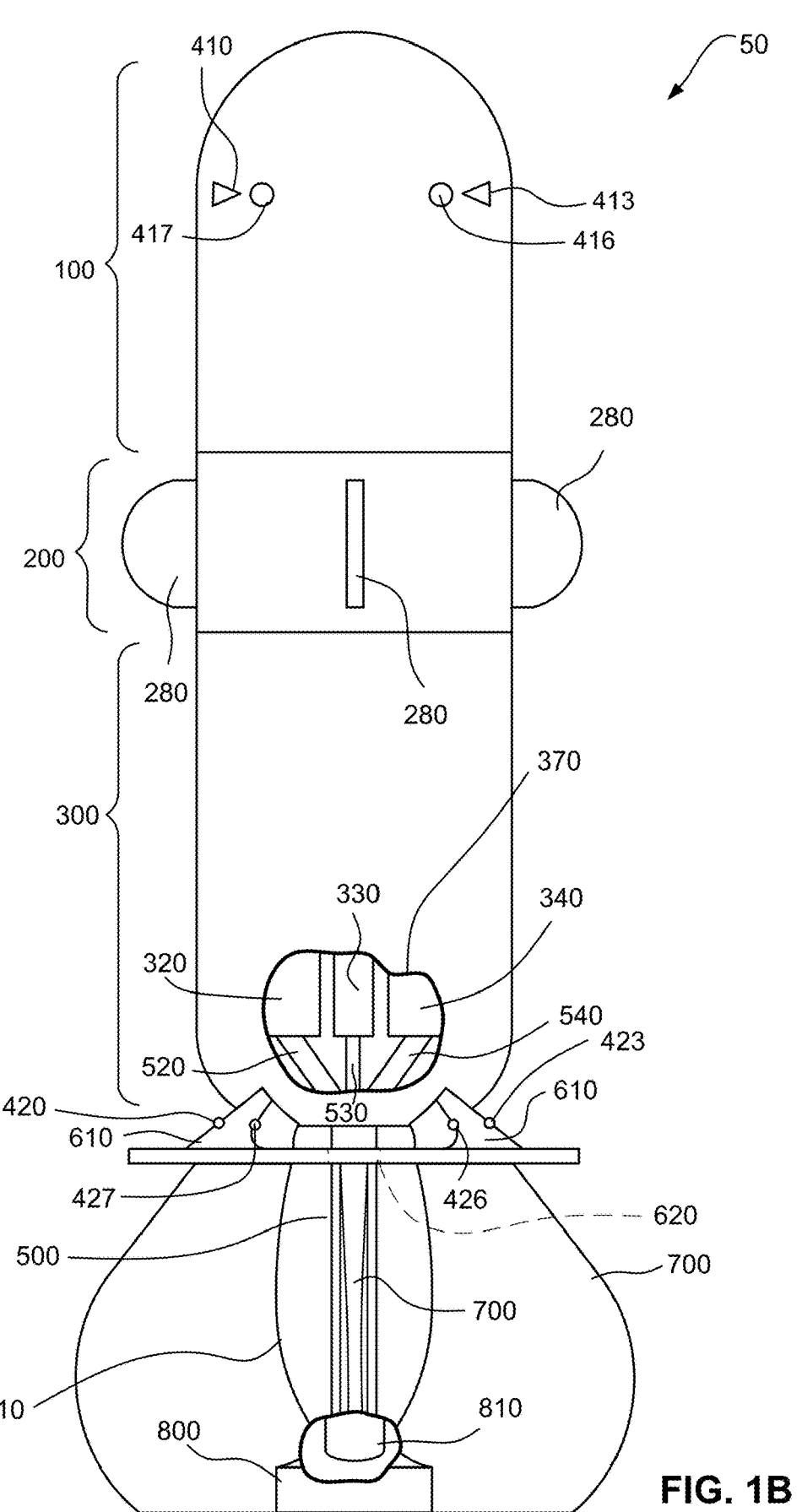
FIG. 1B showing a side view of the long range vehicle #1—with partial cut-away.
Figure 1C:
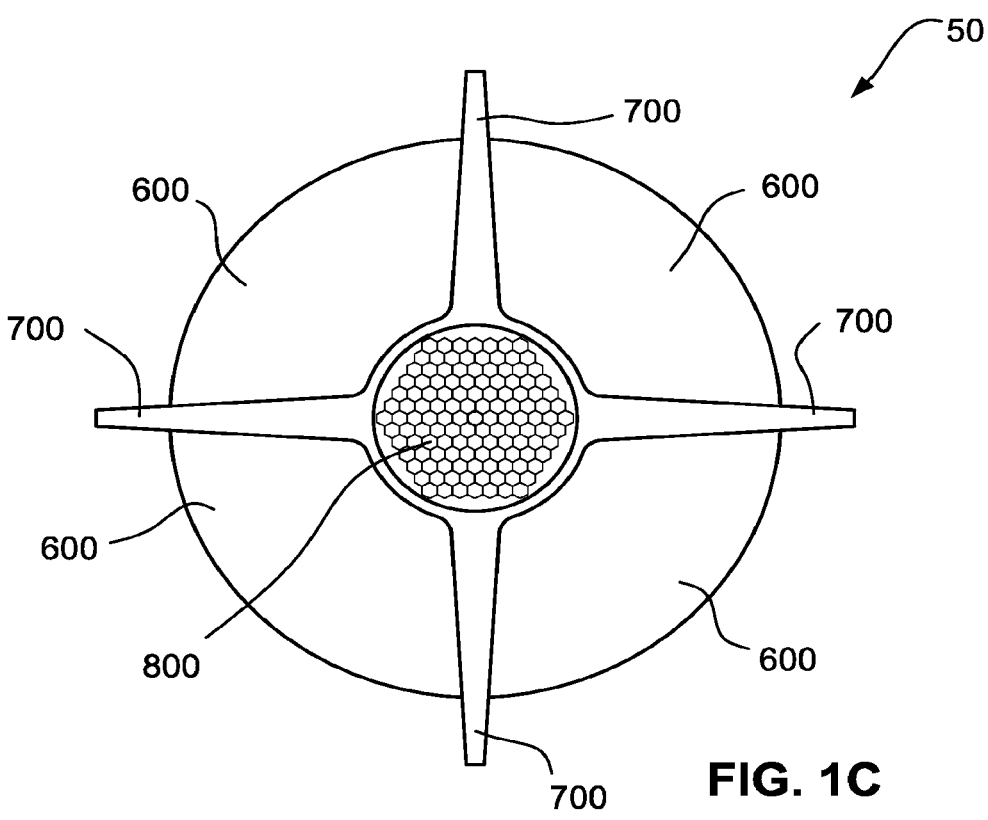
FIG. 1C showing a bottom view of the long range vehicle #1.

ENABLING TECHNOLOGY OF QUANTUM PRINTING NANOSTRUCTURES WITHIN CARBON NANOPORES—NAGEL QUANTUM EFFECT DEVICES (NQEDS)

This application is enabled by the following patents and patent applications naming Christopher Nagel as inventor and assigned to Quantum Elements Development, Inc., Taunton, MA and/or Alpha Portfolio LLC, Naples FL (hereinafter collectively "the Nagel inventions" or "the Nagel patent applications"), each of which is incorporated herein by reference for all purposes as if expressly set forth herein, as well as Nagel's underlying technology developments:

U.S. Pat. No. 1,505,459 P1 issued Nov. 22, 2022

PCT/US2022/41549 filed Aug. 25, 2022 which published as WO2023/038805 on Mar. 16, 2023

U.S. patent application Ser. No. 17/960,961 filed Oct. 6, 2022 and published as US 2023-0234844.

Such devices as disclosed in the Nagel inventions or substantially similar to and/or substitutable for such devices are referred to herein as "Nagel Quantum Effect Devices (NQEDs)." Any reference herein to NQEDs, or use of the Nagel Effects, should be considered in greater generality as including any process that can instantiate, or "quantum print", nucleate, propagate, or manifest material or matter in any way. At this present time, the means and methods of the Nagel discovery are a known way of instantiation—however in the future, as our understanding of these processes and techniques deepens, it is possible other means and methods may be discovered, developed, or brought to our attention— and our references to "NQEDs" and "Nagel Effects" should be understood to encompass and include them as well. Thus, our references herein to "instantiation" and "quantum printing" are intended to encompass any process or technique that may employ any device, apparatus, or process that instantiates, or quantum prints, or assembles, or produces, or extracts, or isolates, or filters, or nucleates, or traps, or manifests, or supplies, or otherwise brings forth relevant materials in any way whatsoever. Some implementations may be viewed as acting on, interacting with or employing dark matter, dark energy, zero point energy, vacuum energy, or the vacuum field.

General Notes:

All patents and patent publications cited herein are incorporated by reference. Use of the phrase "including . . . " should be interpreted as meaning "including but not limited to . . . ", or "including without limitation . . . ". Furthermore, use of the phrase "for example . . . ", "e.g. . . . ", or equivalent linguistic construction, should be interpreted as meaning "for example, without limitation, . . . ". Similarly, use of the phrase "such as . . . " should likewise be interpreted as meaning "such as, without limitation, . . . ".

Any reference to "computer", "CPU", or "processor" should be understood to include any device or means that performs computational or logical processes; such as, without limitation: computers, CPUs, GPUs, ASIC arrays, electric or electronic circuits, electronic devices, transistor devices, silicon devices, photonic devices, digital devices, analog devices, quantum devices. This should also be understood, even when used the singular sense, to include any combination of such devices and means, and regardless of the extent, if at all, to which such devices may be in communication, or networked; and regardless of the means of any such possible communication.

Any "connection" to or from a processor, or in fact any connection across which signals flow, is understood to be capable of implementation using any effective means of conveying signals—including without limitation: electrical wires, signal cables, "wireless", radio communication, or any electromagnetic means, photonic means, optical means, mechanical means, sonic means, quantum means, or any means that uses oscillation or vibration.

As material moves between points it is said to move through a "conduit". Examples of such material include without limitation: hydrogen, helium, oxygen, xenon, argon, krypton, nitrogen, other gases, fuels, ammonia, hydrocarbons, oxidizing agents, hydrogen peroxide, halogens, boron, calcium, aluminum, and any other elements or compounds used within the system. Depending on an implementation's design and engineering constraints, a conduit may vary from being a trivial, almost abstract, connection to a complicated path in which a number of operations are performed, sometimes conditionally, on the subject material. Such operations may include, for example and without limitation, being: pumped, collected, combined, combined with the output of other conduits or sources, pressurized, compressed, liquefied, solidified, dried, stored, packaged, transported, hauled, unpackaged, repackaged, gasified, uncompressed, depressurized, filtered, gated, shunted, injected, diverted, merged, blended, dissolved, extracted, sensed, tested, humidified, dehumidified, monitored, measured, regulated, accumulated, cooled, heated, or otherwise processed. Such operations may involve the use of components including for example and without limitation: pumps, sensors, gates, shunts, injectors, valves, baffles, pipes, splitters, plumbing, relays, filters, controls, accumulators, tanks, containers, reservoirs, fans, pressurizers, humidifiers, dehumidifiers, compressors, refrigerators, blenders, dryers, grinders, dissolvers, extractors, coolers, heaters, liquefiers, and sensors and controls for flow, humidity, concentration, density, temperature, volume, and pressure, as well as other sensors and controls and processing equipment. Each operation may be performed zero or more times, sometimes simultaneously, and the order in which they are performed (and whether they are appropriate or necessary) depends on a particular implementation's design, tradeoffs, and constraints. Conduits may also be used to route power and signal cables.

Detailed Description of Example Non-Limiting Embodiments

FIGS. 1A-1H show an example non-limiting long range vehicle #1 50. The long range vehicle 50 shown is capable of travelling long distances through the vacuum of space or other mediums. It may or may not be manned by human pilots and/or passengers. The long range vehicle 50 shown includes a payload 100; an ancillary electrical power bay 200; secondary radiator structures 280; fuel production and propellant loci 300; secondary guidance propulsion; conduits 500 for power cables, signal cables, fuel, oxidizer, and propellant and possible adjuvant (see e.g., FIG. 2B); primary heat deflector 600; securing structures 610; radiator structures 700; and primary propulsion locus 800.

Detailed Explanation of Embodiment of FIGS. 1A-1G

The following is a more detailed explanation of each of the major systems or portions of vehicle 50:

100: payload; primary locus of control, computation, and logic processors; pilots' cockpit; personnel cabin; life support; living amenities, etc. Signal cables (not illustrated) run from computers here to and through 200, to and through 300, to and through 500, to 400, 600, 800 and 700—and generally to all components of the vehicle, carrying sensor and control signals as needed. See FIG. 1G.

200: ancillary electrical power bay: fuel cell arrays. As described in INSTANTIATION FUEL CELL (WO2023167663A1; U.S. patent application Ser. No. 17/878,850 filed Aug. 1, 2022 which is a CON of Ser. No. 17/554,862 Dec. 17, 2021 ABN which is a CON of Ser. No. 17/316,410 May 10, 2021 ABN which is a CON of Ser. No. 17/127,469 Dec. 18, 2020 ABN which claims benefit of 62/985,838 Mar. 5, 2020 and claims benefit of 62/950,012 Dec. 18, 2019) (all incorporated herein by reference) ("hereinafter "INSTANTATION FUEL CELL") and in the Nagel patent applications. See also FIG. 1H.

Although it is possible to divert a small amount of fuel and oxidizer from fuel production and propellant loci 300 to ancillary electrical power bay 200 (see FIG. 1H), this exemplary embodiment chooses to use proximate NQEDs co-located with the fuel cells of power bay 200. This design is more "self-contained" and modular and avoids the need to pump fuel and oxidizer "upward" against the acceleration "g"-force. Power cables (not illustrated) run from power sources here to destinations and equipment throughout the vehicle: including payload 100, to and through ancillary electrical power bay 200, to and through fuel production and propellant loci 300, to and through conduits 500, and to 400, 600, 800, and 700—and generally to all components of the vehicle 50.

In one embodiment, the fuel cells within ancillary electrical power bay 200 generate heat by-product approximately proportional to the power generated. In the exemplary embodiment, the fuel cells are organized in such a way to conduct this excess heat by-product toward the outer wall of the interior of ancillary electrical power bay 200 where it can flow therefrom to the emissive outside surface where it can be discharged and/or radiated.

We allow the possibility that power can also be produced using generators driven by engines according to the methods taught in INSTANTIATION ENGINE (WO2023167662A1; U.S. patent application Ser. No. 17/672,196 filed Feb. 15, 2022 which is a CON of Ser. No. 17/322,282 May 17, 2021 ABN which is a CON of Ser. No. 17/127,551 Dec. 18, 2020 ABN which claims benefit of 62/985,834 Mar. 5, 2020 and claims benefit of 62/980,111 Feb. 21, 2020 and claims benefit of 62/951,244 Dec. 20, 2019, all incorporated herein by reference), or by any other means deemed appropriate. See FIG. 1G.

280: secondary radiator structures, if needed. Like radiators 700 except they can probably be much smaller, if needed at all, due to having to cope with orders of magnitude less heat byproduct than radiators 700. These radiator fins 280 may be helpful in embodiments that expect ancillary electrical power bay 200 to produce more heat by-product than can be consistently discharged by the normal surface exterior of ancillary electrical power bay 200.

300: production loci for fuel (e.g., hydrogen, or ammonia); oxidizer (e.g., oxygen or hydrogen peroxide); propellant (e.g., xenon) for embodiments using class II and III propulsion; and adjuvant propellant (e.g., xenon), if any. Although not illustrated, note that power and signal cables can run to and through this bay 300. Further note that in the particular geometry of the embodiment illustrated, the lower outside surface, at least, of fuel production and propellant loci 300 can be covered with reflective material to further ward away any stray radiant heat coming from 600, 700, or 800.

One example embodiment uses NQED(s) to create three gases: hydrogen, oxygen and xenon. Among the various engineering trade-offs, this embodiment chooses to somewhat reduce the combustion temperature in favor of increasing the longevity of the combustion chamber. The full stoichiometric combustion temperature of oxygen-hydrogen is 2,800° C. (5,100° F.), which is hotter than most materials can long endure. Existing techniques for managing this high temperature include using ablative surfaces as combustion chamber lining—however this solution is not particularly suitable when a persistent long-term regime of combustion is desired. Temperature reduction can be achieved by mixing a heavy inert material, such as Xenon gas, with combustion to further distribute the energy. Although decreased temperature leads to decreased thrust, this is somewhat (although not entirely) offset by the increased mass expelled. However, sufficiently reducing temperature can give the combustion chamber greater longevity. Yet another embodiment chooses to improve combustion chamber and rocket nozzle longevity by moderating combustion temperature—by using two gases (hydrogen as fuel and oxygen as oxidizer)—but in a fuel-rich combustion mixture. This again reduces temperature by distributing the energy, of those hydrogen molecules which do react, across the mass of the residual unburned hydrogen. Although the exhaust velocity is proportional to the square root of the energy content per gram of propellant, it is also inversely proportional to the mass of the individual exhaust molecules. Thus, such an embodiment should be able to reduce temperature by using excess hydrogen—without sacrificing as much overall exhaust velocity. Similar results can be obtained using an oxidant-rich mixture.

320 (see FIG. 1B cutaway): bays in which fuel (e.g., hydrogen or ammonia) is instantiated/produced/quantum printed by NQED(s).

330: service access passages from main cabin along the backbone. Embodiments may choose to run power and signal cables though these passages.

340: bays in which an oxidizer (e.g., oxygen $O_2$, or hydrogen peroxide), is instantiated/produced/quantum printed/by one or more NQEDs.

350 (not shown): bay in which an adjuvant (e.g., xenon) is instantiated/quantum printed/produced by NQED(s).

370 (see FIG. 1B): cut-away revealing the conduit plumbing location. Conduits from 340 feed at least one oxidizer sub-conduit 540; conduits from 320 feed at least one sub-conduit 520. Power and signal cables from 330 may feed into sub-conduits 530 in various ways to route power and signals to various sub-components of 400, 600, 700, and 800. If present in this embodiment, conduit from 350 (not shown) feeds at least one sub-conduit which may be separate (550; not shown) or may join and mix with either 520 or 540. The point at which sub-conduits 520, 530, 540, and 550 (not shown) differentiate into separate lines destined for the individual propulsion chambers is left to those ordinarily skilled in the art.

Note that while each of the production loci (340 for oxidizer, 320 for fuel, 350 for adjuvant) can be a bay with a cylindrical housing, embodiments may implement these functions in any manner using any desired structure. Furthermore, depending on an embodiment's engineering constraints, any of these loci, in addition to producing material with NQEDs, may also—together with their respective conduits (520, 540, and 550 (not shown))—perform additional functions and take additional steps such as, for example and without limitation (as described above in connection with "conduit"), those of being: collected, combined, combined with the output of other NQEDs, stored, pressurized, compressed, liquefied, pumped, filtered, gated, injected, diverted, monitored, regulated, accumulated, cooled, heated, or otherwise processed through use of components including for example without limitation: pumps, sensors, injectors, valves, relays, controls, accumulators, reservoirs, tanks, fans, pressurizers, compressors, refrigerators, heaters, liquefiers, and sensors and controls for flow, concentration, temperature, humidity, volume, and pressure, as well as other sensors and controls and processing equipment. Each step or operation may be performed zero or more times, and the order in which they are performed (and whether they are necessary) may depend on a particular implementation's design, tradeoffs, and constraints.

410, 411, etc. (see FIG. 1D): secondary guidance propulsion. These propulsion/combustion chambers; thrusters; rocket engines are situated at strategic points—fore and aft with various lateral orientations—to provide course adjustment and alignment maneuvers such as docking and (e.g., midway to destination) reversing vehicle orientation to begin deceleration. In one embodiment, there are eight pairs of secondary alignment/guidance thrusters—four thruster pairs (411/414, 415/412, 413/416, 417/410) fore (illustrated in FIG. 1D) and four thruster pairs (421/424, 425/422, 423/426, 427/420) aft (illustrated in FIG. 1F), each pair situated at one of the four cardinal points, with the two members of each pair oriented 90° apart, each 45° off the normal.

Used in proper combination, these 16 alignment thrusters permit maneuvers along all axes, and provide redundancy in event of thruster failure.

Because these thrusters are used only rarely for short bursts (typically only of a few seconds), there is no need for an elaborate and extensive heat dissipation system similar to 700.

These small thrusters 411 et seq, can be self-contained rocket units (see INSTANTIATION ENGINE), each with its own proximate NQEDs for fuel and oxidizer production—making elaborate plumbing connections from 300 unnecessary. In other embodiments, these small thrusters 411 could be implemented as self-contained class III (electric) thruster units each with their own proximate NQEDs for propellant (e.g., xenon) production. Power may be provided centrally from 200, or proximately (see INSTANTIATION FUEL CELL and FIG. 1G).

The diagram number assigned to each thruster can be decoded to define its function as follows: Consider the diagram number as the big-endian octal representation of an integer. View the low order 4 bits of this integer as "eftu" (eight, four, two, unit).

e=0 defines a thruster on the aft;

e=1 defines a thruster on the fore;

ft=00 defines a thruster on the west side that pushes east;

ft=01 defines a thruster on the east side that pushes west;

ft=10 defines a thruster on the north side that pushes south;

ft=11 defines a thruster on the south side that pushes north;

u=0 defines a thruster that pushes counter-clockwise;

u=1 defines a thruster that pushes clockwise

Figure 1D:
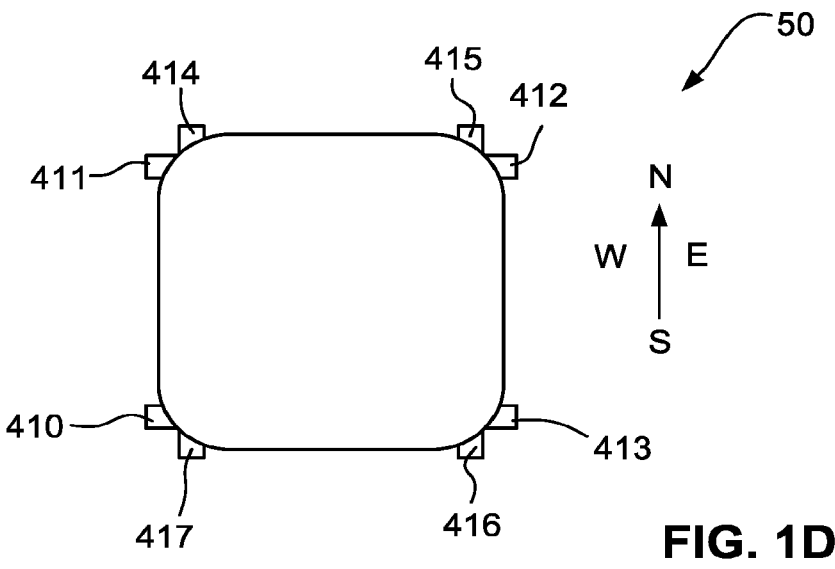
FIG. 1D showing a cross-section of the embodiment of FIG. 1B sliced near the top of section 100 at the level of 410 through 417.
Figure 1E:
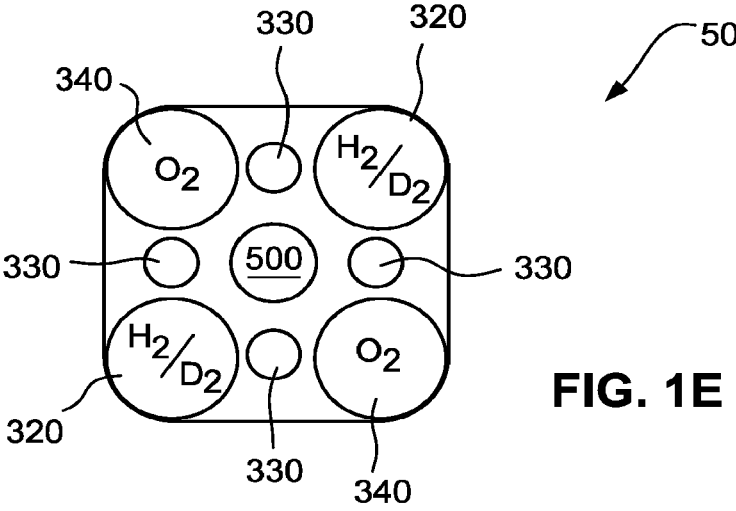
FIG. 1E showing a cross-section of the embodiment of FIG. 1B sliced near the center of section 300.
Figure 1F:
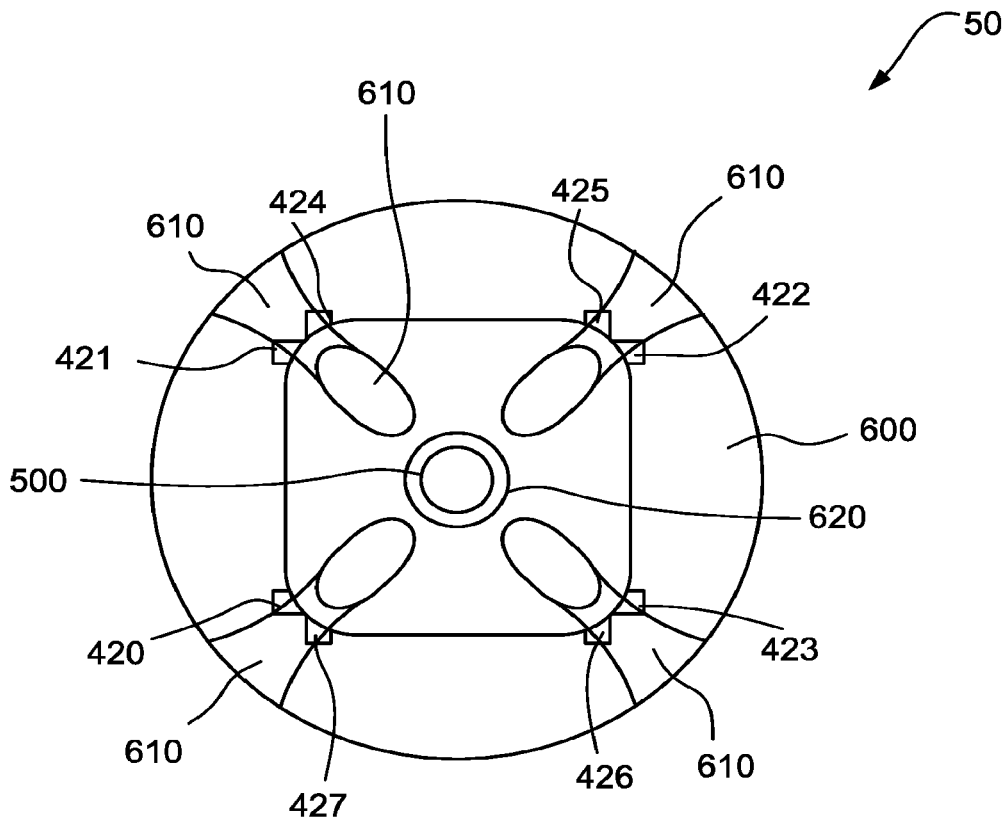
FIG. 1F is a view looking down at a cross-section of the embodiment of FIG. 1B sliced at the level of 420 through 427.
Figure 1G:
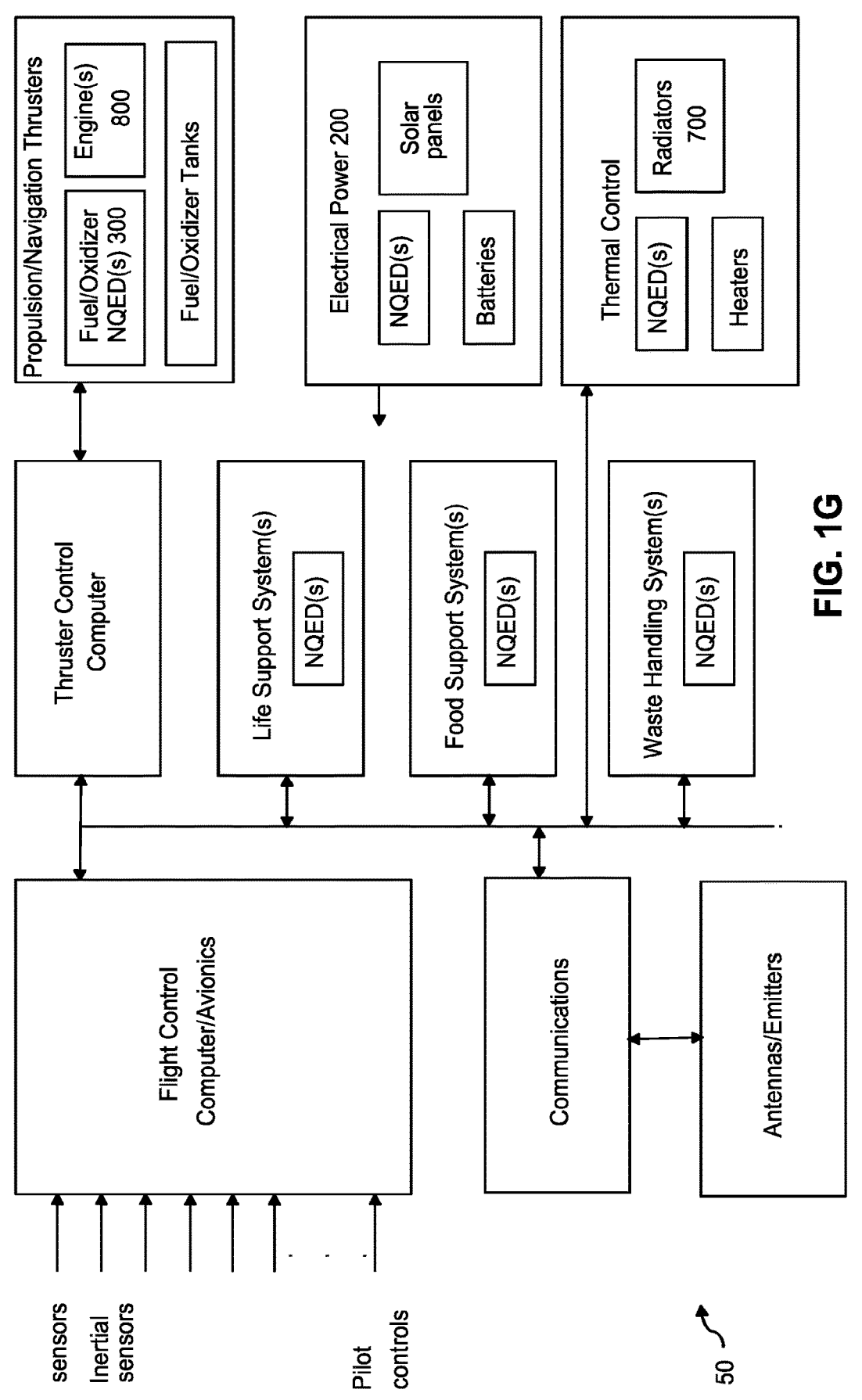
FIG. 1G is an example schematic system block diagram of the FIG. 1A embodiment.
Figure 1H:
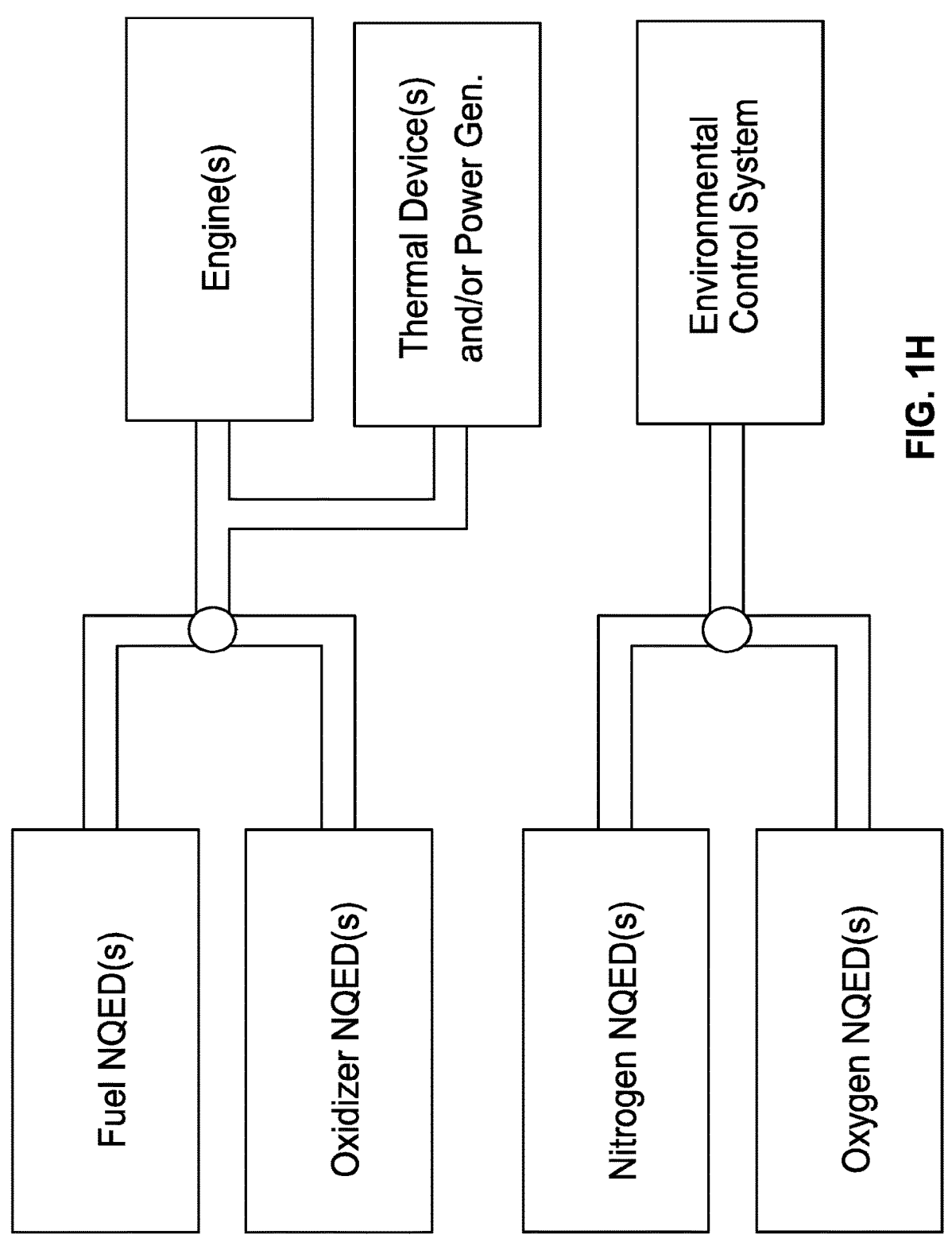
FIG. 1H shows a non-limiting example schematic NQED flow diagram of the FIG. 1A embodiment.

Consider FIG. 1D where 415 is the north fore thruster on the east side which pushes clockwise;

while 417 is the south fore thruster on the west side which pushes clockwise;

and 427 is the south aft thruster on the west side which pushes clockwise;

to push from the top in direction ft, fire 1ft1 and 1ft0.

For example, to roll vehicle 50 clockwise, fire at least one pair eft1 and (etf1 ^0010) where "^" is EXCLUSIVE OR; etc.

500: (see FIG. 2B) conduits for fuel; oxidizer; adjuvant propellant; signal cables; power cables. This can be thought of as the lower backbone of the vehicle 50. It passes through an opening in deflector 600 (see FIG. 1C) avoiding, as much as possible, contact with, and proximity to, hot elements 600, 700, and 800 except at the critical juncture 810 where 500 delivers fuel, oxidizer, adjuvant propellant, power, and control and sensor connections, through different sub-conduits within 500 to 800 where heat resistant plumbing then delivers these elements separately and individually to the at least one propulsion chamber(s). Depending on the adjuvant, if any, some embodiments may be able to mix adjuvant with fuel and deliver them together, or for inert adjuvant (such as xenon for example), to mix adjuvant and oxidizer together and deliver them to the propulsion chambers through a common sub-conduit. The outside surface of conduit 500 is covered with heat-reflective material to ward away stray heat emitted from the narrow interior edge 710 of each radiator fin 700 which is exposed to 500.

600: primary heat deflector/barrier, and structural link. Deflects away from (100, 200, 300) any primary heat emitted by 700 or 800. Top and bottom surfaces of 600 are reflective; sandwiching a sturdy non-conductive interior.

Serves as a primary structural link connecting the upper structural components (100, 200, 300) to the lower structural components (700, 800). The upper components are attached with struts 610 to 300; while the lower components are attached by 700. In the exemplary embodiment, 600 is an annulus ("donut") shape, having a central hole 620 through which the vehicle's backbone 500 passes without contact—to avoid heat as much as possible.

610: Structures attaching 600 to 300. These structurally connect the lower portion of the vehicle (which mostly deals with propulsion 800 and heat remediation 700) to the upper components (100, 200, 300). These struts are sturdy and not particularly heat conductive.

700: radiator structures. These are heat conductive structure(s) with heat emissive surface(s). Due to fundamental thermodynamic inefficiencies, a significant fraction of the energy created by the combustion process to produce thrust also generates unwanted heat by-product—a by-product that is absorbed through the combustion chamber walls—which will, if not dealt with on an on-going basis, ultimately flow through the entire vessel—building-up heat. Energy produced by combustion is disposed in three ways: (i) as forward thrust, increasing the vehicle's kinetic energy, (ii) as hot propellant which is expelled, and (iii) as radiant (heat) energy emitted from the surface of the vehicle. It is the remediation of (iii) that is a primary concern and purpose of the radiator structure(s) illustrated in the example embodiments.

Radiators 700, in embodiments desiring long-term thrust, conduct heat away from 800, where it is produced, as rapidly as it is produced, to areas of the surface where it can be just as rapidly be emitted into space as radiant energy. To this end, radiators 700 ideally comprise an emissive surface supported by a structure capable of rapidly conducting heat from 800 to the entirety of that emissive surface; the heat-conducting structure may be capable of moving and distributing the heat as fast as it is produced as 800 by-product; and the emissive surface may be capable of radiating the heat as fast as conduction delivers it and may be dealt with on an on-going basis otherwise it will flow through the entire vessel and build-up heat. There are many possible candidate radiator designs that might be considered when designing an embodiment—a few of which are highlighted in these examples. However, the example non-limiting embodiments of the technology herein intend to employ or encompass any radiator design capable of remediating the heat produced by prolonged operation of the propulsion system.

710 (see FIG. 1B): This is the inner edge of fin 700 which faces 500—and in one embodiment is the only part of 700 which has a low-emissive surface—which is done to limit as much as possible, heat reaching 500.

800: Primary propulsion locus; propulsion/combustion chambers; thrusters; rocket engines. There are several classes of propulsion embodiments that may be used, for example:

Class I: Chemical Propulsion

As taught in INSTANTIATION ENGINE, NQEDs produce fuel (e.g., hydrogen, ammonia, alcohol, hydrocarbon, etc) and oxidizing agent (e.g., oxygen, hydrogen peroxide, etc.) which are conducted to at least one propulsion (combustion; reaction) chamber where they become propellant by being combined in a combustion reaction to produce rocket thrust which propels the vehicle.

In some embodiments, NQEDs may also produce propellant adjuvants which are conducted to the propulsion chamber where they are added during combustion to affect some aspect of the reaction and/or exhaust, such as for example, without limitation: the temperature, heat, velocity, momentum, or kinetic energy—for example aluminum may be added to increase energy; or xenon or other massive non-reactive material may be added to convert some of the heat energy to kinetic energy—thus reducing the temperature (but thereby enhancing combustion chamber longevity). Effective reaction temperature can also be moderated by using a fuel (e.g., hydrogen) rich mixture so that the reaction energy is divided across a greater mass.

Class II: Atomic Propulsion

Energy is provided by an atomic reactor.

Types of atomic reactors include:

Fission reactors, although well understood and presently available, create radioactive by-products—making it difficult to easily service the engine or replenish fuel—and may create a hazard in event of a mishap.

Fusion reactors, such as Tokamak-style design have high neutron flux which may induce radioactivity and erosion of materials within reactor interior itself.

Fusion reactors (such as the TAE Davinci-style prototype) based on the Rostoker-Binderbauer proton/boron-11 fusion reaction are "aneutronic" and create no neutrons or radioactive by-product—simplifying service and fuel replenishment en route. For very long voyages, the fuel for the fusion reaction itself also be generated by NQEDs tuned to manifest Boron-11. These reactors also possess a powerful plasma field which might be used to accelerate propellant. Although these reactors are not presently available commercially, they may be within the lifetime of this patent. See e.g., Labaune et al, "Fusion reactions initiated by laser-accelerated particle beams in a laser-produced plasma", Nature Communications volume 4, Article number: 2506 (2013).

Operationally, at least one NQED on board the vehicle provides an unlimited supply of at least one propellant (e.g., xenon or other material), assembling it as needed. This propellant is directed—either continuously, or in batches—to the propulsion chamber(s) where it produces thrust as it is vigorously expelled after being heated by energy produced by at least one atomic power plant. There are at least 3 ways this could be done:

a) The atomic plant produces heat to thermally expand the propellant—giving rocket-like thrust to propel the vehicle forward. In this case, there are probably many elements that would be candidates for propellant. Xenon can be considered—as it is naturally a gas at temperatures compatible with NQED operation (which permits easy transfer into the propulsion chambers), it is inert (which avoids chemical reaction with the NQEDs and other equipment—including the propulsion chamber itself and any conduits leading thereto), and it is dense (which provides more thrust momentum per molecule at any given temperature). Although the next heavier noble gas, Radon, is substantially denser, the inconvenience and risk associated with its radioactive nature make it less desirable formany situations. On the other hand, using a light gas, such as hydrogen, might yield higher exhaust velocity.

b) The atomic plant is used to produce electricity to power electric thrusters—such thrusters as described in Case III below. In this case, candidates for propellant will be whatever materials are appropriate for use with the chosen electric thrusters—for example, without limitation, Xenon and Argon might be appropriate with some electric thruster technologies.

c) Atomic plants (such as the TAE Davinci-style prototype) based on the Rostoker-Binderbauer proton/boron-11 fusion reaction, have an inherent plasma field which might be directly utilized to accelerate the propellant.

Class III: Electric Propulsion

In electric propulsion embodiments, at least one NQED is used to produce reactants-typically, e.g., hydrogen and oxygen.

These reactants are used to produce electricity in at least one of the following ways:

(a) they are conducted to at least one fuel cell where they are used in a manner taught by INSTANTIATION FUEL CELL to produce electricity; or (b) they are conducted to at least one engine (e.g., internal combustion engine or turbine engine) where they are used in a manner taught by INSTANTIATION ENGINE to power said engine(s) which drive at least one generator that produces electricity.

NQEDs are also used to produce material(s) used as propellant (e.g., xenon, or argon) with at least one electric (or ionic, or plasma) propulsion thruster (e.g., without limitation, Hall-Effect Thruster [HET], VASIMIR, NEXT-C).

The electricity and the propellant are conducted to the at least one electric propulsion thruster(s) where the electricity is ultimately used by the thruster to accelerate the propellant—producing thrust which propels the vehicle. Most of the existing electric thrusters have been optimized to operate on the very limited power available with solar panels on today's small satellites and spacecraft. Substantially more powerful thrusters will likely become available during the life of this patent, perhaps even in response to the opportunities enabled by this technology.

Without limitation, here are some ELECTRIC PROPULSION THRUSTERS and technologies that may be considered:

Hall-Effect thruster (HET) uses xenon, krypton—also argon, bismuth, iodine, magnesium and zinc; thrust depends on power level. Devices at 1.35 kW produce about 83 mN of thrust; high-power models up to 5.4 N in laboratory; power levels up to 100 kW have been demonstrated for xenon Hall thrusters. See e.g., https://en.wikipedia.org/wiki/Hall-effect_thruster; PPS®1350-E plasma thruster from Snecma (Safran); https://www.safran-group.com/media/20140722_snecmas-ppsr1350-e-plasma-thruster-sets-world-record Variable Specific Impulse Magnetoplasma Rocket (VASIMR) is a type of electrothermal plasma thruster/electrothermal magnetoplasma thruster in which a neutral, inert propellant (such as argon or xenon) is ionized and heated using radio waves. The resulting plasma is then accelerated with magnetic fields to generate thrust. See Ad Astra Rocket Company (AARC)—latest model VX-200SS; VX-200 engine requires 200 kW electrical power to produce 5 N of thrust, or 40 KW/N. See https://en.wikipedia.org/wiki/Variable_Specific_Impulse_Magnetoplasma_Rocket NASA Evolutionary Xenon Thruster (NEXT)—NEXT-C Aerojet Rocketdyne, and their major sub-contractor ZIN Technologies, retain the rights See https://en.wikipedia.org/wiki/NEXT_(ion_thruster)

Advanced_Electric_Propulsion_System

See https://en.wikipedia.org/wiki/Advanced_Electric_Propulsion_System

FEEP Field Emission Electric Propulsion [mercury, cadmium, . . . ]

Field Effect Electric Propulsion

Lightning Electric Field Propulsion

Gridded Ion Thruster

With electric thrusters, there are at least two loci of heat consideration: (i) in the fuel cells as the chemical reaction generates electricity, and (ii) in the electric thruster as electricity is used to produce thrust.

810 (see FIG. 1B): this cut-away occurs at approximately where the sub-conduits 520, 530, 540, 550 diverge to bring fuel, oxidizer, adjuvant, power, and control and sensing connections to the various individual propulsion chambers. Plumbing details are not shown.

The rockets may be implemented using NQED-powered engines as disclosed in INSTANTIATION ENGINE and LONG RANGE VEHICLE patent applications referenced above. Herein in connection with the vehicles shown in the Figure, the terms "rocket", "thruster", "engine", and "motor" are generally used as synonyms. In many preferred embodiments, there are three categories of thrusters: Lift thrusters, forward thrusters, and steering thrusters:

Lift thrusters ("lifters") are directed "downward". These can serve to act against a gravity field, keeping the craft suspended in, or propelling it away from, the gravity source. In some embodiments, these perform the "lift" function generally analogous to a helicopter's main rotor(s).

Forward thrusters ("pushers") are directed "backward". For embodiments having a clearly identified "front", these thrusters can serve to propel the craft "forward" which is considered to be the direction of primary lateral motion, a direction which is typically orthogonal to "downward". For embodiments without a clearly identified front, or forward direction, there may be no clearly distinguished category of forward thrusters—lateral motion being achieved instead by combinations of Steering thrusters. For space-tailored embodiments, which may lack pusher engines, reasonable forward motion in the atmosphere (or within any gravity influence) can also be achieved by pitching down slightly, helicopter-like, and vectoring some lifter force into forward motion.

Steering ("trim") thrusters are used to adjust the orientation of the craft—including "turning", yaw (rotation around the up-to-down axis); roll (rotation around the front-to-back axis); pitch (rotation around the left-to-right axis); and lateral translation (some rigid motion, not involving yaw, in a plane orthogonal to "downward").

Nearly all vehicle embodiments are likely to have distinguishable Lifter and Steering thrusters, whereas Pushing thrusters are specifically identified for discussion of later embodiments herein.

Long Duration Flight

All three propulsion classes offer the prospect of a conceptually unlimited range—constrained only by other practical matters such as reliability, maintenance, equipment endurance, and crew lifetime. Vehicles that cannot manage surface take-off or landing could be assembled in orbit. Once travel is underway, the on-board NQEDs provide an unlimited supply of propellant and fuel. Closed cycle life-support systems are already well-understood; although these can be augmented with NQEDs to replenish, for example, atmospheric gases as they are gradually lost through leakage.

Once a craft has been accelerated to travel in a desired trajectory at a desired velocity in the vacuum of space, it experiences substantially no drag or other effects due to atmosphere or other friction. Rather, under Newton's laws of motion, the craft will continue on an initial trajectory at an initial velocity indefinitely unless/until a force is applied to change its trajectory and/or velocity. In long range space travel, therefore, unlike what people see in the movies, no thrust is required on a continual basis—the only thrust required may be corrective (navigational) thrust to make strategic course and/or attitude changes and the like. This means that even small quantity production of fuel materials by low-capacity output NQEDs may be sufficient to power the navigational rocket system of a long range vehicle in space.

As an illustrative example, the New Horizons satellite that was used for flybys past Pluto and Arrokoth at launch carried just 77 kilograms (170 pounds) of hydrazine as a fuel. In New Horizons, the propulsion system was used for course corrections and for pointing the spacecraft. See e.g., Stratton, "The Use Of The Aerojet Mr-103h Thruster On The New Horizons Mission To Pluto", IAC-04-S.1.09, 55th International Astronautical Congress, Vancouver, Canada (2004).—The New Horizons propulsion system is not used to speed the spacecraft along its trajectory to Arrokoth and beyond—that was done by the launch vehicle, with a boost from Jupiter's gravity. But the New Horizons propulsion system did make small corrections to the flight path and tiny changes to the speed to ensure that New Horizons arrives when and where it can make the best observations. For example, after the Pluto encounter, the satellite changed the trajectory very slightly to go to Arrokoth.

In one example embodiment herein, even small capacity output NQEDs given enough time between engine firings will be able to produce and store (e.g., into storage tanks) sufficient propellant and/or rocket fuel and oxidizing agent to navigate the FIG. 1A craft. By way of analogy, a dripping faucet does not supply sufficient flow to operate a lawn sprinkler but can fill an entire bucket if left dripping overnight.

In one example embodiment, fuel or propellant tanks at launch could begin full to capacity, and NQEDs could be responsible only for replenishing part or all of fuel, oxidizing agent and/or propellant as it is used sporadically for navigational purposes. Any suitable gas could be used as a propellant delivered to a propellant nozzle, which could expulse the gas "as is" without any chemical reaction to provide an acceleration effect (think of letting go of an untied blown up balloon) . . . . For rocket engines, any suitable fuels and oxidizing agents and associate reaction(s) (e.g., a hypergolic reaction between nitrogen dioxide $NO_2$ and dimethyl hydrazine $C_2H_8N_2$ as one example) could be used. A given vehicle could use either or both mechanisms. Because of the ability of an NQED(s) to "make (quantum print) more", the technology herein thus offers the possibility of running indefinitely and making prolonged voyages across vast distances.

Furthermore, because neither fuel nor propellant is constrained, the spacecraft in some embodiments can operate under continuous acceleration—with no obvious upper-bound on the velocity. There seems no reason at this time to expect that the quantum effects devices, or quantum instantiation, will be adversely affected by any—even relativistic—velocity.

Thermal/Heat Management and Radiators

For a Class I (Chemical Propulsion) and class IIa (atomic propulsion) vehicle, the materials comprising the Propulsion Chamber(s) and rocket nozzle(s) are a primary concern—as is the strategy and tactics for their operation.

For chemical propulsion, the maximum temperature of oxygen-hydrogen flame (achieved with an exact stoichiometric mixture of 2:1 hydrogen: oxygen) is 2,800° C. (5,100° F.), while, for example, it will be lower for other mixtures (such as 2,100° C. (3,800° F.) with normal atmospheric gases). This temperature can be selectively moderated ("tuned") lower by including more excess ingredients (such as excess hydrogen, excess oxidant, or adjuvant) during combustion. Fuels other than hydrogen (such as, e.g., ammonia, alcohol, other hydrocarbons, etc.), and oxidants other than oxygen (such as, e.g., hydrogen peroxide, ozone, etc.) are apt to have different combustion constraints.

For atomic propulsion, there is no particular maximum temperature—it may be possible to use magnetic or electromagnetic fields to contain the plasma—allowing higher temperatures than physical containment would permit.

For electric propulsion, the fuel cells, at least, will generate heat—due to fundamental inefficiencies—as a by-product correlated to the electric energy produced. Thrusters are also expected to produce heat as they convert electric energy to thrust.

In general, the Propulsion Chamber design is open to many avenues of implementation, falling into two primary categories: magnetic containment, versus a more traditional rocket "combustion" chamber.

First consider the latter approach:

Physical propulsion chambers associated with chemical and atomic propulsion should:

1—be able to endure long term stress of hot propellant under high pressure—thrust is positively correlated to the mass of the propellant, its temperature, its pressure, and its exit velocity—so the more resistant the chamber is to heat and pressure, the more efficient the rocket's performance 2—be a good thermal conductor in order to carry away the excess heat by-product which is left over after either (i) producing thrust (that thus increases the vehicle's forward kinetic energy), or (ii) being expelled from the chamber as hot exhaust, or (iii) is discharged immediately into space as radiant energy by the rocket nozzles. Unlike atmospheric jet engines which can be cooled by contact with air (conduction and convection); and unlike traditional chemical rockets in which the amount of energy that must be dissipated is bounded by the fuel they can carry, propulsion chambers of some example embodiments described herein are subject to very long to indefinitely long fuel-burns—and unless the excess heat can be conducted away and dissipated it will build up indefinitely until the material fails.

Candidate materials to consider for nozzle(s) and combustion/propulsion chamber(s) include:

hafnium carbide (HfC)—with a melting point of 3,958° C. (7,156° F.)

tantalum carbide (TaC)—with a melting point of 3,768° C. (6,814° F.)

tungsten—with a melting point of 3,422° C. (6,192° F.)

cubic boron nitride (CBN or c-BN)—with a melting point of 2,973° C. (5,383° F.)

tungsten carbide—with a melting point of 2,770° C. (5,018° F.)

molybdenum—with a melting point of 2,623° C. (4,753° F.)

niobium (columbium)—with a melting point of 2,468° C. (4,474° F.)

tungsten-molybdenum alloys

Inconel alloys—Alloys of nickel, chromium and often cobalt, generally with smaller amounts of niobium, molybdenum, iron, and a variety of other elements to give different characteristics.

graphite tungsten aluminum alloys carbon/carbon (C/C) composites—heat resistant up to 3,000° C. (and higher)

see https://www.ihi.co.jp/ia/en/research/04/index.html

In all cases, the excess heat by-product that may be produced at the various loci must be dissipated. Heat can be managed through conduction and radiant loss. In "outer space," excess heat is ultimately discharged by radiative emission from the outward facing vessel surfaces of sufficient area. Conduction can shift the heat to other parts of the vehicle—however, the vehicle as a whole must be able to radiantly discharge all excess heat. Depending on the amount of heat, it is possible that the vehicle's natural surface geometry might suffice—although for maximum ongoing thrust, many designs will want to drive the engines for prolonged periods with as much ongoing temperature and thrust as engineering constraints permit. To improve steady state radiant discharge rates to allow prolonged propulsion, many embodiments will cope with the heat by providing additional RADIATORS—architectural features such as radiative fins, "wings", shells, and other emissive surfaces—to the base vehicle in ways that efficiently conduct heat from propulsion chambers, and other heat sources, to the radiator surface(s) to be dissipated. This may affect the design and structure of the vehicle. Aspects of radiator design include without limitation: size, strength, extent, shape, weight, composition, materials, position, structure, construction, geometry, configuration, thermal emissivity, thermal conductivity, thermal reflectivity, thermal insulation and depend on engineering constraints and requirements specific to each embodiment.

example non-limiting materials for radiators 700:

thermally radiative materials—with high emissivity coefficients; for example:

those with High Emissivity Coatings (HECs) with emissivity near 0.9 or higher lampblack paint at 0.98 tile at 0.97 anodized aluminum, at 0.9 oxidized copper at 0.87 oxidized steel at 0.79 carbon (graphite) at 0.7 to 0.8 at temperatures up to 3600° C.

thermally low radiative materials (low emissivity), such as:

polished gold at 0.025 aluminum foil, at 0.03 polished silver at 0.02 to 0.03 unpolished silver at 0.04 polished copper at 0.04 polished steel at 0.07 thermally conducting materials [in W/(m K)]

cubic boron nitride (c-BN)—also very hard, strong, thermally stable to over 2900° C. (thus also a candidate for the propulsion chamber materials)

diamond at 1000 silicon carbide at 120 copper: 401 @ 0° C.; 383 @ 327° C.; 371 @ 527° C.; 357 @ 727° C.; 342 @ 927° C.

gold: 318 @ 0° C.; 304 @ 327° C.; 292 @ 527° C.; 278 @ 727° C.; 262 @ 927° C.

aluminum: 236 @ 0° C.; 232 @ 327° C.; 220 @ 527° C.

thermally insulating material, such as:

any well-known insulator combinations of materials in which some may be more emissive; more conducting, more insulating, less conductive, less emissive, more reflective, more weight-bearing, lighter.

Some implementations may not use all of these types of layers and features.

Radiators are apt to be constructed in layers:

Layers: Without limitation, radiators are likely to have one or more of these various layers:

(i) An outer surface layer, exposed to space, which might be expected to be covered or coated with thermally radiative material(s) having a high emissivity coefficient; such as, for example: lampblack paint, tile, graphite, or anodized aluminum.

(ii) Adjacent to (i) will likely be one or more layers of highly thermally-conductive material(s) such as diamond, cubic boron nitrite, or copper designed to rapidly move/diffuse heat to the widest possible area.

(iii) A weight bearing structural layer, possibly body structure or struts or ribs, to support the other layers.

(iv) A thermally insulative layer.

The radiators in some example embodiments are tightly coupled physically to the combustion/propulsion chamber(s), rocket nozzle(s), and heat sources to expedite heat flow from them into the radiator(s). Embodiments might consider two-sided radiators such as fins where both sides are exposed to "space" and both can be used to emit heat; and one sided radiators—such as the vehicle's body skin—where the outside is emissive and the inside is insulative.

Moving through a two-sided radiative "fin" one might find layers: (i), (ii), (iii), (ii), (i). If feasible it might be desirable to somehow integrate (ii) & (iii) into a common layer covered on each side with (i): i.e., (i), (ii/iii), (i).

Moving inward through a one-sided radiative surface such as part of the vehicle's skin, one might find layers: (i), (ii), (iii), (iv) or (i), (ii), (iv), (iii).

Many more or other configurations are possible.

Example non-limiting Radiator shapes, geometry, and architecture:

In some exemplary designs, the radiator surface is a huge shell firmly attached to the hot propulsion components by strong thermally conducting means—but, held away from the main vessel by weight-bearing thermally non-conducting struts or other attachment means. For example, without limitation, the shell's surface shape might be approximately that of:

a cylinder a sphere, ellipsoid, a truncated sphere, ellipsoid, paraboloid, hyperboloid, or other conic section of rotation a truncated cone or pyramid facing rearward, a geodesic dome, sphere, or other structure rendered geodesically.

one or more of these shapes facing in various directions, or any other geometry or combination of geometries that effectively radiates heat away from the craft's hot spots, and prevents heat reaching the payload or other thermally sensitive areas.

configurations in which the radiating surface is held, positioned, and contoured to reduce the amount of the radiating surface "visible" to the vessel's payload or other thermally sensitive areas. This is done to reduce the amount of radiated heat recaptured by the payload or other thermally sensitive areas.

radiative surface(s) attached to the vehicle in a way that conducts heat from the propulsion chambers to the surface.

shells held away from the main (payload and temperature sensitive) part(s) of the vehicle in ways which are not thermally conductive (such as insulative struts).

In some exemplary designs, the Radiator may embody zero or more of these features:

in layers: where emissive materials are outward facing (away from the payload), toward space in layers: with more conducting materials "underneath" (closer to the payload) the more emissive layers. These serve to effectively distribute heat to emissive layer(s)

in layers, some with more weight-bearing strength;

in layers: with insulating materials buffering heat flow as needed; for example, between conducting layers and a low emissive layer.

in layers, with less emissive more inward (closer to the payload or facing the payload).

In many possible geometric configurations of the radiating surface, especially perhaps those which mostly or partially surround the payload, it will be desirable in some embodiments to reduce the amount of heat which is radiated back toward the payload vessel. Consider a possible design wherein the radiator is an enormous (say, spherical-like) shell surrounding the payload and attached to the (hot) propulsion engines by thermally conducting struts which move the propulsion heat by-product into the shell. The conductive layer will distribute heat rapidly through the shell; the emissive layer on the outer surface (just on top of the conducting layer) will emit heat into space. In steady state operation, parts of this shell will be hot; ideally, the emissive exterior of the shell will radiate a large proportion of heat away from the vessel into space. However the inside surface of the shell will be in thermal equilibrium and so the inner surface will tend to radiate some (presumably small) portion of the heat into the shell's interior—back toward the vessel and other parts of the inner shell surface, tending to warm the vessel. This effect can be ameliorated, if necessary, by putting a low emissivity layer on the interior shell surface (facing the payload), and a reflective, low emissivity surface on the payload. Depending on actual engineering facts, it may be desirable to have an insulating layer between the conducting and the inner low-emissivity layers.

the attachment of the radiator: in steady-state operation, the radiator will have a heat gradient—being required to endure higher temperatures closer to the heat source (propulsion chamber(s)). Since the Radiator is often "supported" by its attachment to the propulsion chamber(s), the attachment may need to be more weight-bearing closer to the Propulsion Chambers—as well as more heat tolerant and thermally conductive. This might entail thicker or more massive structure, and different materials than other parts of the Radiator.

"Veins", or "ribs" in or near the Radiator surface to provide structural strength, to facilitate heat transfer, or both. Possible designs include a "vascular" arrangement in which thicker, stronger, and/or more conductive trunks branch out into lighter, smaller, maybe thinner, structures as the need to support weight, and to transfer and tolerate heat, diminishes with distance from the Propulsion Chamber(s). Parts at different distances from the Propulsion Chamber(s) may be fashioned of different qualities—materials, dimensions, thickness, weights. In some cases, this may depend on how much weight, strength, emissivity, conductivity, and heat tolerance is required at a given portion of the surface. Areas further from the Propulsion Chamber(s) are likely to be cooler and not required to support as much weight, or tolerate, conduct, or emit as much heat as areas closer to the Propulsion Chamber(s).

a 'honey-comb" grid of cells of hexagonal, pentagonal, square, triangular, and/or other geometric shapes which spread out from the Propulsion Chamber(s). This grid could serve to transfer heat to the emissive material surfacing each cell; as well as possibly to support the weight of the Radiator surface—much like a section of a dome, a geodesic dome or a bucky-ball-like structure.

depending on shell geometry, configuration, placement, and other specific engineering facts, not all of these types of layers or features may be necessary, useful, or even desirable.

There is no particular limit to the size of radiator surfaces, however there are other constraints—many of which are mutually related and involve engineering and design trade-offs—including but not limited to:

overall mass. Designs that seek to operate with continuous, or near-continuous, thrust will experience g-force-like acceleration ("weight"). Depending on the thrust, this apparent "weight" will be some ratio or fraction of Earth-g—presumably, for the comfort of passengers (if any)—not much more than one-g. Provided overall engineering design constraints can be met, there is no conceptual reason that prevents this force from exceeding earth-g—aside from the comfort of passengers, if any. High g-force might be acceptable for unmanned automated probes, or drones, or even for crew who are trained to tolerate such force. In any case, the vehicle's overall architecture should be strong enough to support the effective "weight" of its parts. For a given thrust:

the acceleration (effective g-force) will be inversely proportional to the overall mass.

the thrust is positively correlated to the heat produced by the propulsion chamber(s)

the area required for an emissive radiant surface area is positively correlated to heat production.

in steady-state operation, where the overall ongoing heat production is balanced by its dissipation, the radiant surface will have a heat gradient—being required to endure higher temperatures closer to the propulsion chamber(s) and reactor(s). This includes the structure by which the surface is connected to the heat sources. Thus in many designs it seems likely the portions of the radiating surface (including attachments) will be more massive the closer they are to the heat source—this is both to increase strength for supporting the entire radiator surface, and to increase heat flow outward to further extremities.

Time to Destination

The time to destination, as measured externally by a stationary observer (say, from the vehicle's point of departure) will be strongly correlated to the (inverse square of the) acceleration. For prolonged voyages, involving high velocity, relativistic effects will affect all such computations for the onboard crew, apparatus, and the overall vehicle; all will experience time-dilation—in which so-called "proper time" will (always) be less than that observed from the "fixed" origin or destination points; and can be dramatically less for velocities very close to the speed of light.

Exemplary Embodiment #2

This leads to one exemplary class of architecture, shown in FIGS. 2A-2B, and described as follows: visualize the craft 70 vertically where the direction of travel is up. Consider the one or more propulsion chambers (downward directed) clustered together as the Propulsion Pod 800. This Propulsion Pod is attached by strong heat-conducting means 815 (such as struts, or "spokes") to the top of the Radiator 700. The spokes 815 are better seen in FIG. 2B. In some embodiments, the top of 700 might be a sturdy heat-conducting disc joining 700 to 800.

Figure 2A:
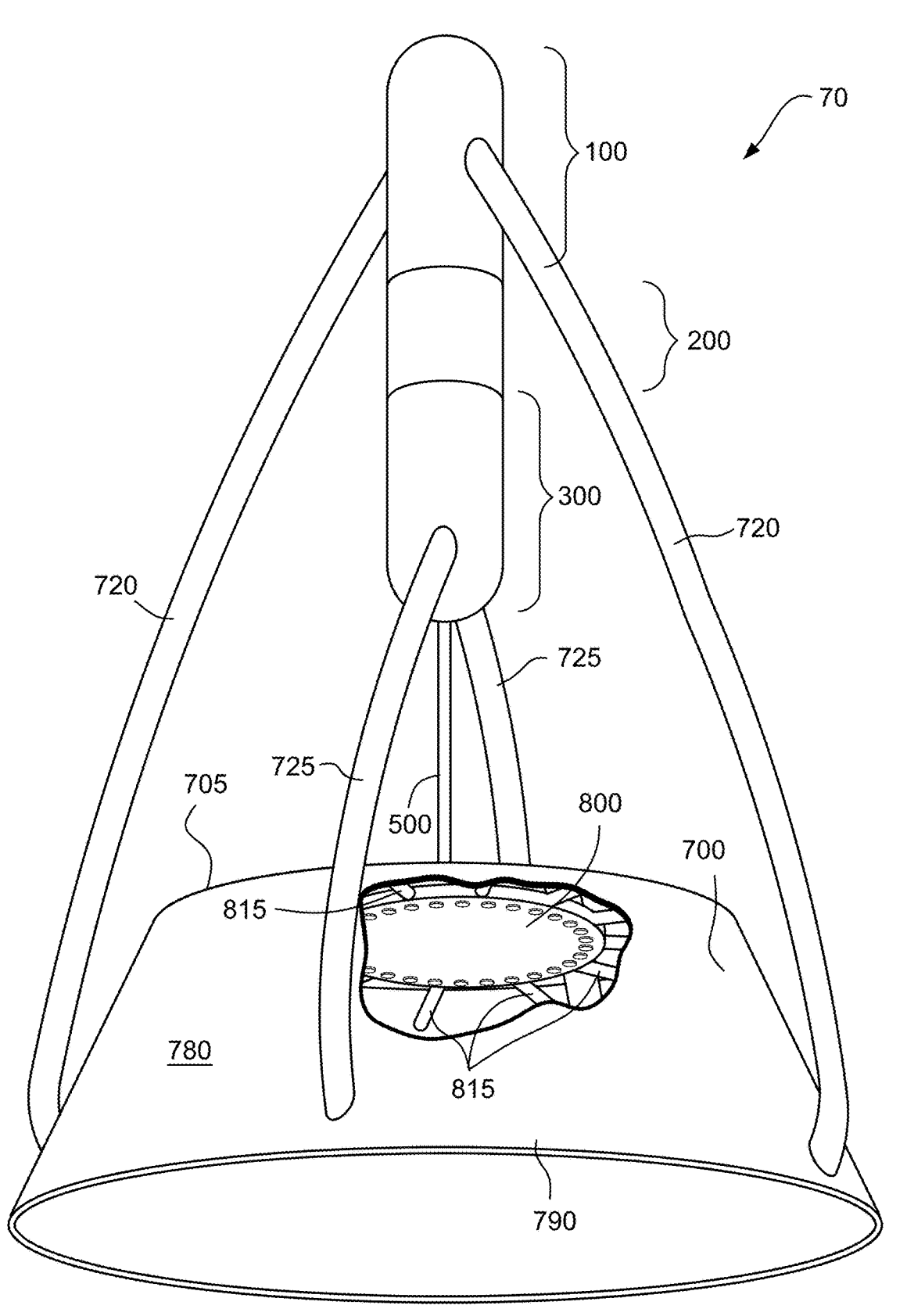
FIG. 2A showing an ascending elevation of example embodiment #2 of a different long range vehicle—with partial cut-away.
Figure 2B:
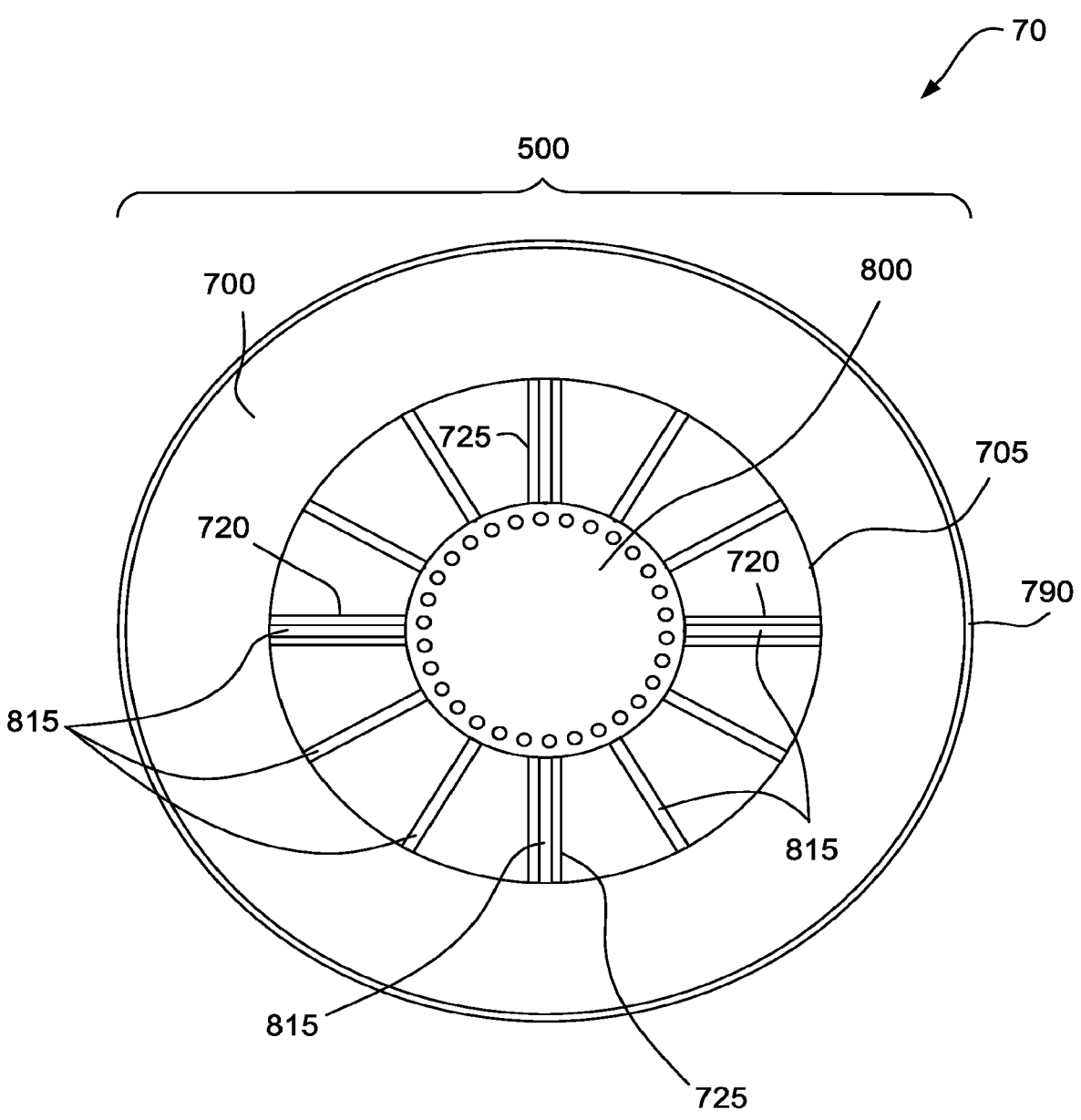
FIG. 2B showing a bottom view of the long range vehicle #2.
Figure 2C:
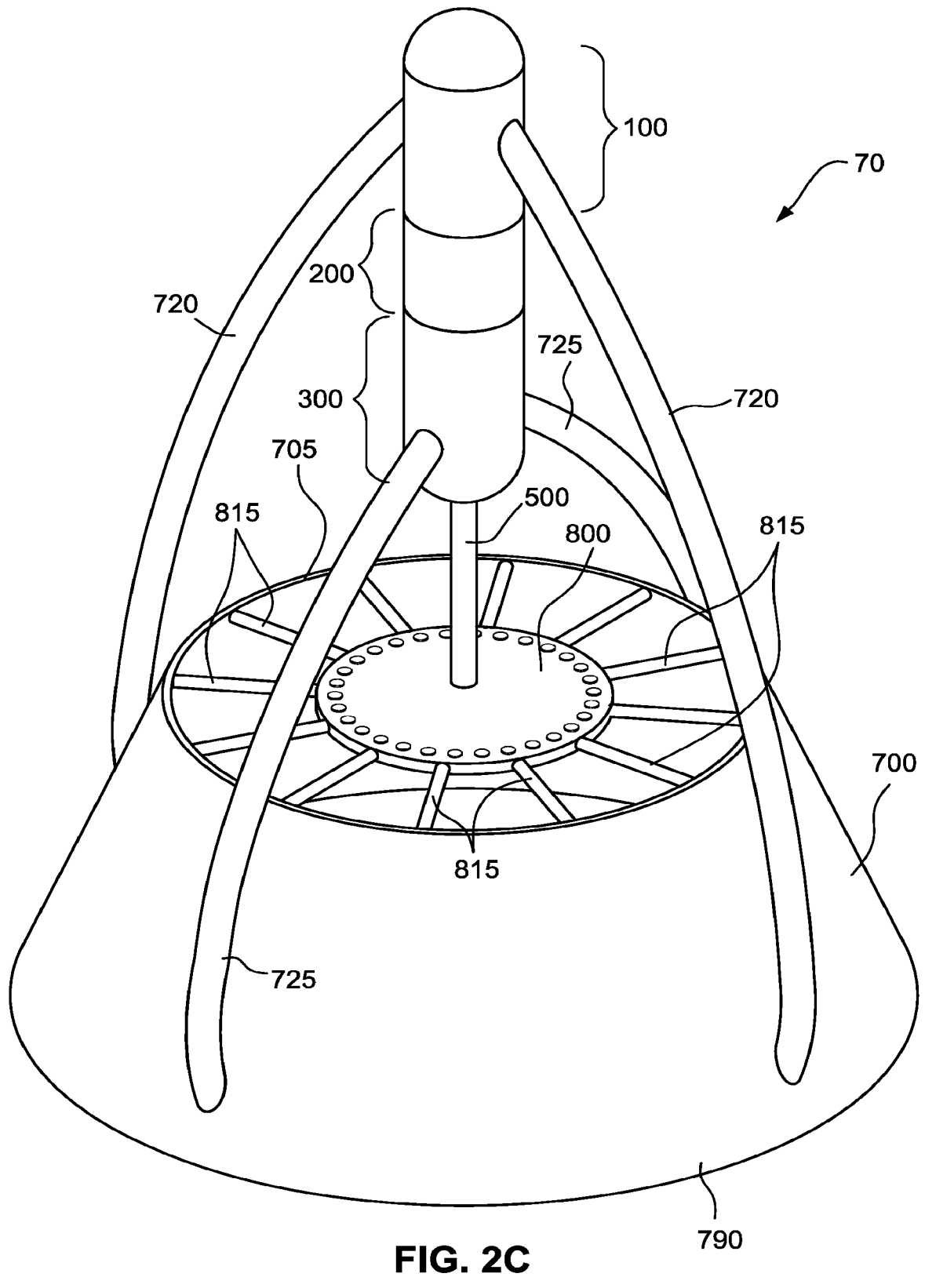
FIG. 2C showing another view of the long range vehicle #2.

The Radiator 700's surface is that of the bottom portion of a truncated cone (or n-sided pyramid or other cone-like structure)—forming a "skirt" 790, where the base of the skirt is at the bottom of FIG. 2A. The outside of the skirt 790 is highly emissive. The Propulsion Pod 800 is mounted to the Radiator 700 near the top 705 of the skirt 790, so the chambers of the propulsion pod are directed downward from or through the top of the skirt. The high velocity hot propellant will move downward, as a hot narrow blast stream, through the skirt 790 and exit the wider end (the base) without interacting much with the Radiator 700. The residual excess energy (i.e., the energy not consumed by increasing the vehicle's velocity, and not expelled as hot propellant), will flow by thermal conduction into the Radiator 700 to be emitted into space. In steady-state operation, the Radiator 700 will experience a temperature/heat gradient with the highest values near the top, which is closest to the Propulsion Pod 800 connection, and the lowest at the bottom.

The Payload Pod (Cabin in one embodiment) 100 is positioned at the top of FIG. 2A approximately where the vertex of the truncated cone would have been. The Cabin 100 is, by long ("Tower") struts 720 & 725, attached to near the bottom of the Radiator skirt 790 (the coolest point of the skirt's heat gradient). Being located at the cone's virtual vertex, the Cabin 100's point-of-view subtends the edge of the cone's surface—giving minimal line-of-sight area of the hot Radiator 700 surface. Furthermore, the cabin 100, at least the bottom of section 300, has a reflective surface. By properly configuring the dimensions of the virtual cone and the distance from vertex to the truncation, the Cabin 100's view of the area subtended by the extremely hot Propulsion Pod 800 can also be minimized.

The geometry, architecture, and materials comprising these tower struts 720, 725 are in some example embodiments designed of sturdy non-thermally conductive material—with their inward-facing surfaces (facing 700) being reflective in order to conduct, and reabsorb, as little heat as possible from the Radiator's outer surface 780, and with their outward facing surfaces (facing into space, away from 700) being emissive in order to further radiate away any stray heat it may have acquired—before that heat reaches the cabin-end of the strut.

Ideally, the radiant heat lost by the cabin 100 will equal or exceed that (i) generated within the cabin pod itself; and (ii) received by conduction through the cabin struts from the radiator, and (iii) reabsorbed from radiant heat dissipated by the rest of the ship. (including the edge-on view of the Radiator 700 surface and the top-on view of the Propulsion Pod 800). If, despite best engineering efforts, this is not the case, then some slight buildup can be discharged (as needed) using one or more NQED devices to assemble material, such as a gas, then using refrigeration or heat pump techniques to extract excess (Cabin) heat; then finally jettisoning this heated material into space.

Example Guide to Spaceship Design

As explained above, using onboard NQEDs to produce unlimited supplies of fuel, oxidizer, and other materials—eliminating the enormous logistic, gravitational, structural, and mechanical burden of transporting them—provides the option to consider operating rocket engines on a continuing long-term basis. One of the new trade-offs that now presents itself is how to achieve maximum total thrust over time. Once outside a deep gravity well, even modest thrust, applied continuously over time, has remarkable effect.

Perhaps the first question to consider when designing an embodiment is (I) "what temperature allows the engines to run indefi-nitely—or, at least, for very long periods?"

This temperature is limited by two factors:

(a) the material(s) comprising the rockets' chambers and nozzles.

(b) whether the vehicle's radiators can discharge, on a continuing basis, the excess heat by-product generated by combustion: This is the energy not used to increase the kinetic energy of the vehicle and not expelled in the exhaust.

(II) once a combustion temperature is decided, typically the highest possible that satisfies both (Ia) and (Ib), select a conforming engine and nozzle design, the number of engines desired, and a radiator design that accommodates this overall architecture.

(III) Estimate the total mass of the engines, radiator structures, vehicle body, infrastructures, NQED apparatus, support systems, plumbing, and expected payload (essentially the vehicle's "GO weight" or operational mass) and divide this mass into the expected aggregate engine thrust (when operating at temperature (I) or less) to derive "a"—the acceleration, or effective "g"-force. If this is near to or less than 9.8 m/s/s (Earth's surface gravity) then the vehicle cannot be reliably launched from, or land on, Earth under its own power—but should probably be assembled "in space" and remain there during its operational life. If "a" exceeds 9.8 m/s/s by, say, 10%, 20%, or more, then—if properly designed—the vehicle may be capable of direct ascent from, and landing on, Earth's surface.

Primary Propulsion

The primary propulsion drives the vehicle in its main, major, direction of travel. As explained above, most embodiments are also expected to have secondary, or ancillary, propulsion systems for guidance, course correction, and maneuvering—although it may be possible in some embodiments for the primary propulsion to be used for such secondary functions by manipulating and redirecting some energy from the primary thrust flow with the use of control surfaces such as flaps, louvers, diverters, "ailerons", etc. and/or magnetic or electromagnetic fields.

For simple unmanned missions where redundancy is not cost-effective; or those using very large scale massive propulsion (such as class II atomics) where redundancy is impractical; or short-range or medium-range missions where "rescue" is feasible—an embodiment may choose to use only a single primary propulsion engine/thruster. Embodiments desiring to maintain continuous uniform acceleration, but in which it is necessary for engines to "rest" to avoid overheating or fatigue, will also need to provide for engine redundancy. Thus, embodiments designed for long-range missions, or manned missions where rescue may not be feasible, or that need to limit continuous operation of any engine, or that expect to deactivate engines occasionally for maintenance, are encouraged to use multiple, redundant, propulsion engines/thrusters. Those skilled in the art will understand that there are an almost unlimited number of engine arrangements. Without intending limitation, we mention a few appealing arrangements used in some preferred embodiments herein illustrated: engines are arranged in a circle of 6, 12, 20, 30, 60, etc.—like a clock face—around the vehicle's central axis of the direction of travel. In other example embodiments, engines might be arranged in patterns derived from hexagons with 7, 19, 37, 61, . . . , $1+3*n*(n-1)$, . . . elements. This permits a variety of available balanced, radially symmetric, configurations even if multiple engines fail or are inactive. Employing active engines together as in radially symmetric groups is desirable because it eliminates the tendency to "yaw"—which tendency would otherwise require active course correction to counteract. A radially symmetric group is any pair separated by 180°, any triple by 120°, any quintuple by 72°, etc.—where the engines are equidistance from the center; and any collection of non-intersecting symmetric groups. Radially balanced groups, subsets of engines, may be used in "shifts" or bursts—being switched on and off in intervals—perhaps as a longevity strategy to avoid heat fatigue or other materials stress abatement. This becomes an engineering trade-off since cycling engines through hot and cold periods may itself induce stress due to repetitive expansion and contraction.

One appealing example embodiment, suitable for implementations that can tolerate the redundant mass, has 60 engines arranged like clock-face minutes, where each engine can, say, individually supply at least 5% of the total force necessary to maintain a desired one-g (9.8 m/sec/sec) acceleration. With this configuration there are at least 30 million ways to select the 10 balanced pairs necessary to achieve one-g—with no engine needing to be active more than ⅓ of the time, on average. How long each engine can remain active depends on engineering and materials constraints specific to each embodiment. With this type of resting strategy, as one symmetric group (e.g., pair) of engines is inactivated, systems control logic in the vehicle's computer processing systems can simultaneously activate another group (having the same number of engines) in a way that provides the smoothest, most continuous, transition possible. It is not clear, and it will depend on the engines being used, how closely the force curves of engine power-up can be matched with those of engine power-down. In the example under discussion, any transitional jolt seems likely to be less than 0.1 g—possibly annoying if it's that much, but tolerable perhaps to seasoned voyagers such as sailors and crew who are accustomed to constant motion and shifting acceleration.

However, if this is a problem, there are several avenues (involving tradeoffs) to consider to abate this:

(i) increasing the interval of activation—thus reducing the frequency of jolts—although longer activation periods may cause more engine stress and decrease their longevity;

(ii) less powerful engines, but more of them—for example 1200 smaller propulsion engines each supplying only ¼₀₀=0.25% of the acceleration. (One appealing arrangement for 1200 engines is a large hexagon of side 21 minus the central interior hexagon of side 5.) This way the jolt attributable to each transition is likely to be much less. Furthermore, less energetic engines are likely to suffer less material fatigue and be able to sustain longer run intervals with less wear. However, more engines "weigh" more and require more "plumbing", conduits, and infrastructure, (iii) more precisely balance the power-up and power-down curves by improved throttling;

(iv) by injecting another brief acceleration force at each transition to better balance any difference between the power-up versus power-down curves. For example, such brief force might be rendered by a single special engine located at the center point of the ring of primary engines—or this could be the engine at the center of a hexagonal pattern. Such central engine might be of the same or different propulsion class as the primary engines, but would be required to closely complement the power-up versus power-down difference of each cycle of primary propulsion engines,

Combined Primary Propulsion Techniques

The technology herein is intended to encompass a large variety of designs suited for various purposes, missions, and needs. The possibility is envisioned that some embodiments may employ multiple propulsion techniques, even for primary propulsion. Examples of such diverse preferred embodiments include, without limitation:

designs for very long range where constant enduring propulsion over a long time is desirable—such as multi-week/multi-year voyages. In this case class III, IIb, or IIc primary propulsion might be most durable and reliable—especially if there is no intent to use the vehicle in any atmosphere, making the excess mass of dual primary propulsion systems unwarranted.

designs for short-range voyages, measured in minutes or hours—say from the Earth's surface to orbital distance or even to the Moon—and return—where class I primary propulsion may be altogether adequate and appropriate.

designs for medium-range voyages, measured in hours or a few days—say from Earth to its moon, or even to Mars—where class III primary propulsion may be desirable outside the atmosphere, but class I propulsion may be better suited than class III for surface take-off and landing. Such embodiments may be equipped with both class I and class III primary propulsion

Ancillary Propulsion (Course Correction, Guidance, and Maneuvering)

Most embodiments are anticipated to have secondary, or ancillary, propulsion systems for guidance, course correction, and maneuvering—although it may be possible in some embodiments for the primary propulsion to be used for such secondary functions by manipulating, diverting, or redirecting some energy from the primary thrust flow with the use of flaps, louvers, diverters, "ailerons", or other aerodynamic control surfaces, etc. or magnetic or electric fields, or by altering the direction of thrust. Also, for embodiments having several primary propulsion engines, it may be possible to do course correction, guidance, and maneuvering by activating engines in an imbalanced manner to induce yaw—although this may be difficult to use for tight maneuvers such as docking, For embodiments with secondary, ancillary, propulsion, such propulsion may comprise at least one or more engine units (typically multiple) mounted to produce lateral thrust. Such units may be of any propulsion class—not necessarily matching the primary propulsion, although typically they are of class I or class III, and usually smaller and less powerful than the primary propulsion engines—since they are generally used only infrequently for short bursts. In some embodiments, secondary maneuvering engines may be pivotable.

Ancillary Functions (Life Support)

Life support systems aboard space vehicles have been studied rather thoroughly and are generally well understood. Embodiments may incorporate the associated QUIBA and/or THERMAL INSTANTIATION disclosures and/or application Ser. Nos. 17/141,921 and 17/141,875 each filed 5 Jan. 2021 and each entitled "Quantum Production And Supply Of One Or More Breathing Or Other Substances To An Organism"; whereby at least one NQED can be used to supply and replenish the breathable atmosphere of the long range vehicle—an atmosphere which is prone to escape into the vacuum of space—and to maintain the cabin/payload at a comfortable temperature. Embodiments can use QUIBA to instantiate breathable atmosphere which is moved through conduits into the ventilation systems.

Embodiments may also use NQED technology to produce water. For embodiments utilizing INSTANTIATION FUEL CELLS, water will be produced as a byproduct of electricity production—probably in many cases more than enough for human consumption, with the excess needing to be jettisoned. Otherwise one or more Advanced NQEDs can be configured to instantiate (or quantum print) water directly—possibly even replete with healthy minerals (imbibing pure $H_2O$ over time leaches minerals from the body); or indirectly by instantiating hydrogen and oxygen and then combining them through reaction (but not forgetting to include healthy minerals). See application Ser. Nos. 17/141,921 and 17/141,875 each filed 5 Jan. 2021 and each entitled "Quantum Production And Supply Of One Or More Breathing Or Other Substances To An Organism". Life support equipment also involves many other devices and apparatuses—the powering of which is described in ANCILLARY POWER.

Advanced Radiation Shielding

Cosmic radiation, comprised mainly of high speed protons and helium nuclei, is ubiquitous beyond the Earth's natural magnetic shielding (its magnetosphere) and poses significant long term risk to those who abide in space—or even on the surface of most planetary bodies. Gold or platinum, for example, with their atoms packed extraordinarily densely into face-centered cubic lattice structures, have the potential to offer better shielding against cosmic rays than most other substances; better even than lead. (Of course any good shielding material could be used as a massive barrier, it's just that gold, platinum, palladium, iridium, osmium, etc seem particularly suitable.) Appropriately tuned NQEDs could economically instantiate enough such metal to entirely envelope crew living quarters with a protective layer, an encapsulating barrier, of such shielding. Other substances, such as polyethylene or lithium hydride, for example and without limitation, could be layered onto the interior of such a heavy barrier to absorb the secondary cascade of particles produced by the collision of incoming cosmic rays with the massive metal atomic nuclei. Without using NQEDs to provide essentially unlimited sustained propulsion, incorporating such massive shielding into a space vehicle would be prohibitively unthinkable—since, under such circumstances, takeoff weight becomes the singularly most critical expense factor. Beyond the journey itself, a well-equipped colonization team could bring sufficient and varied NQEDs with them, together with a complement of tools and biologicals (e.g., starter plants, seeds, bacteria, etc.) to produce shelter, shielding, atmosphere, water, fuel, food, and other essentials and amenities.

Ancillary Power

Electricity may be required to operate many vehicle functions and onboard equipment, including for example and without limitation: computers and processors; life support systems and amenities; controllers; sensors; controls; monitors; thermostats; detectors; alarms; conduits and conduit components; collectors and accumulators; pumps; fans; injectors; accumulators; valves; gates; shunts; plumbing; pressurizers; compressors; humidifiers and dehumidifiers; filters; purifiers; refrigerators; extractors; blenders; dissolvers; coolers; heaters; liquefiers; engines and engine support; NQEDs; and NQED support; QUIBA apparatus; tools; navigation; communication; ventilation systems; air conditioning systems; sanitary systems; food storage and preparation equipment; and other equipment.

Electricity can be produced as follows:

At least one NQED is used to produce reactants—typically hydrogen and oxygen.

These reactants are used to produce electricity in at least one of two ways:

(a) the reactants are conducted to at least one fuel cell where they are used in a manner taught by INSTANTIATION FUEL CELL to produce electricity; or (b) the reactants are conducted to at least one engine (e.g., internal combustion engine or turbine engine) where they are used in a manner taught by INSTANTIATION ENGINE to power said engine(s) which drive (/s) at least one generator that produces electricity. At least one battery is likely to be required, at least to start the vehicle, to activate the control computers and the devices used to produce the ongoing ancillary power. The charge of batteries used by the vehicle and its infrastructure can be restored and maintained once ancillary power production is underway.

NQED Operation

The associated NQED states and properties (including, but not limited to humidity, temperature, wavelength, pulse frequency, and amplitude) are coordinated with the geometry and material qualities of the cavities/tubes within the NQEDs to extract specific types of atoms and molecules. NQEDs require power—at least to establish their required operating state and properties and to initiate activity—and perhaps on an ongoing basis to maintain and assure their proper operating environment.

Variable (Primary) Thrust

Embodiments which are able to provide primary engines with variable thrust may be able to gracefully land on and take-off from surfaces provided that the engines can overcome the surface gravity.

Conduits and Flow

As material moves between points it is said to move through a conduit. Examples of such material include without limitation: hydrogen, oxygen, xenon, argon, nitrogen, other gases, fuels, oxidizing agents, boron, and any other elements or compounds used within the system. Depending on an implementation's design and engineering constraints, a conduit may vary from being a trivial, almost abstract, connection to a complicated path in which a number of operations are performed, sometimes conditionally, on the subject material.

Such operations may include, for example and without limitation, being: pumped, collected, combined, combined with the output of other conduits or sources, stored, pressurized, compressed, liquefied, solidified, filtered, gated, shunted, injected, diverted, merged, blended, dissolved, extracted, sensed, tested, humidified, dehumidified, monitored, measured, regulated, accumulated, cooled, heated, or otherwise processed. Such operations may involve the use of components including for example and without limitation: pumps, sensors, gates, shunts, injectors, valves, baffles, pipes, splitters, plumbing, relays, filters, controls, accumulators, tanks, reservoirs, fans, pressurizers, humidifiers, dehumidifiers, compressors, refrigerators, blenders, dissolvers, extractors, dryers, coolers, heaters, liquefiers, and sensors and controls for flow, humidity, concentration, temperature, volume, and pressure, as well as other sensors and controls and processing equipment.

Each operation may be performed zero or more times, sometimes simultaneously, and the order in which they are performed (and whether they are necessary) depends on a particular implementation's design, tradeoffs, and constraints. Conduits may also be used to route power and signals and signal cables.

Additional Example Details

In some implementations, especially class I (chemical) embodiments, propulsion is provided by the reaction ("combustion") of two or more materials—at least one fuel material ("fuel") and at least one oxidizing agent ("agent")—in one or more propulsion chambers. An embodiment can be implemented using any materials that can be assembled by an NQED or compounds derived from such material, especially those in which the reaction produces rapidly expanding hot gases. Exemplary embodiments may use fuels such as, without limitation: hydrogen, ammonia, various types of alcohols, various types of hydrocarbons, etc.; oxidants such as, without limitation: oxygen, hydrogen peroxide, ozone, the halogens, etc.; and various isotopes or isomers thereof.

Reliability, Endurance, Repair and Maintenance

The technology herein contemplates a wide variety of design possibilities, depending for example on mission intention (interstellar multi-decade operation imposes a different, and probably more stringent, set of constraints than intra-solar system operation involving runs of days or weeks), with engineering and cost trade-offs. The payload of an interstellar vehicle seems likely to encompass and support a community with many of the amenities associated with a village or town—like a magnificent cruise ship or regal luxury ocean liner—whereas an interplanetary vehicle can be much simpler and smaller, perhaps more along the lines of today's more ordinary ocean vessels.

Alternative and Auxiliary Propulsion Methods

One exemplary (class IIa) fusion propulsion method uses the Nagel Effect to generate propellant material (we suggest Xenon gas as a candidate possibility) which is heated by energy from a Rostoker-Binderbaur Boron-11 fusion reactor. This methodology may be suitable for long-haul and interstellar journeys—especially since the material fueling the reactor, boron-11, is many orders of magnitude less than the propellant requirement and, if necessary, can even be easily assembled using onboard NQEDs configured for boron-11. Replenishing the reactor is simple since it does not involve handling toxic or radioactive substances.

However, a variety of other power plant implementations are possible, and some may be easier and quicker to design and implement in the immediate and intermediate future—including for example, any types of fission reactors. In many implementations, it may well be feasible to assume that sufficient reactor fuel can be stocked on board, even for moderately long flights within our solar system.

In addition, we consider chemical combustion propulsion implementations in which the propellants are chemicals which provide propulsion by their combustion in the propulsion chamber(s). These combustion chemicals are generated on board with Nagel devices (or equivalent). Examples of this include the chemicals oxygen and hydrogen, which are directed to the Propulsion Chambers where they are ignited and burned. This follows familiar well-known rocket paradigms—differing primarily in that the combustible propellant is generated on-board and does not need to be carried. Conceptually, traditional tanks of rocket propellant (fuel and oxidizer) are replaced by an array of (much more weight efficient) Nagel devices. This eliminates one of the most serious constraints in existing space science and enables many new possibilities, In many implementations, including some of our examples, such chemical combustion is used in auxiliary rocket units mounted laterally to effect steering, guidance, course correction, and maneuvering.

Regardless of the propulsion method, NQEDs can produce chemicals onboard to provide chemical reactions to power other energy needs—such as electricity for equipment, computers, and other apparatus and amenities.

Continuous Versus Intermittent Propulsion

Depending on overall constraints, including the rate at which propellant can be produced on board, and the methods used to expand it—it may be desirable or necessary in some embodiments to collect propellant into batches and consume ("expend") it in intermittent bursts. For instance, it might be desirable to assemble the propellant into intermediate holding tanks—possibly then compressing, liquefying, or in some way transforming it—before injecting it into a propulsion chamber for combustion or explosive expansion.

Steering, Guidance, and Maneuvering

Conventional steering, guidance and maneuvering technology such as known by those skilled the art may be employed.

Embodiment #3

Aerospace Go Anywhere Vehicle, any Direction, any Distance, any Speed ("Gavadadas")

FIGS. 3A, 3B and 4A, 4B show an example embodiment #3 comprising an aerospace vehicle or craft that can fly through the air aerodynamically and also operate in the vacuum of space. We refer to this vehicle as "GAVADA-DAS" (Aerospace Go Anywhere Vehicle, Any Direction, Any Distance, Any Speed).

The meaning of pictorial number tags used in the illustrations herein, but which are not herein defined, are intended to carry the same, or analogous, significance as the similarly numbered tags explained in association with the illustrations discussed above Functions associated with items 100, 200, 300, 320, 330, 340, 350, 370, and conduits 500, 520, 530, 540, 550 discussed above are in connection with embodiments 1 and 2 may all be present in this embodiment although only 100 is explicitly identified in our illustrations; the others being situated at unspecified interior loci and not shown. The lifter thrusters identified as 800, may be of any class and correspond generally to the main engines of described above, which are similarly tagged. The pusher engines, 840 may also be of any class, although typically would be the same class as 800. It should be noted that, at the present time, not all implementations of Class III (electric) thrusters will operate effectively in an atmosphere—and thus their utility will likely limited to operation in space. In one exemplary embodiment, the lifting, pusher, and steering thrusters use class I (chemical) propulsion.

The radiator structure items 705, 710, 720, 725, and 790 described above need not have any particular analog in the GAVADADAS embodiment. Rather, radiator functions in the illustrated GAVADADAS embodiment are performed by the surfaces of the "wings" 700, their nacelles 734 and (in some embodiments) the wings' aerodynamic control surfaces 920 and 925. The outer surface of these comprise a layer of durable, heat-resistant, emissive material over one or more layers of strong, durable, heat-resistant and heat-conductive materials, as described above.

Figure 3A:
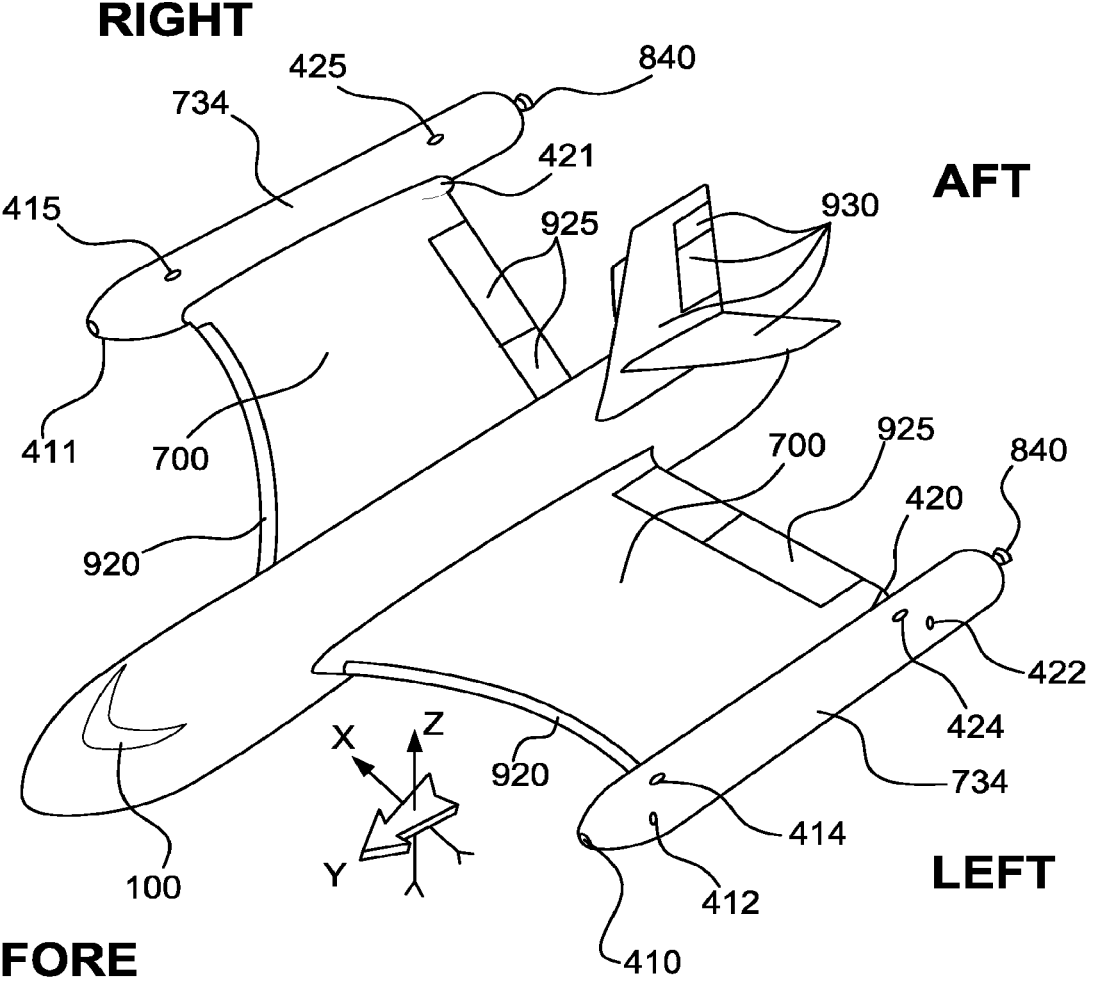
FIG. 3A showing a top view of an example aerospace vehicle #3.
Figure 3B:
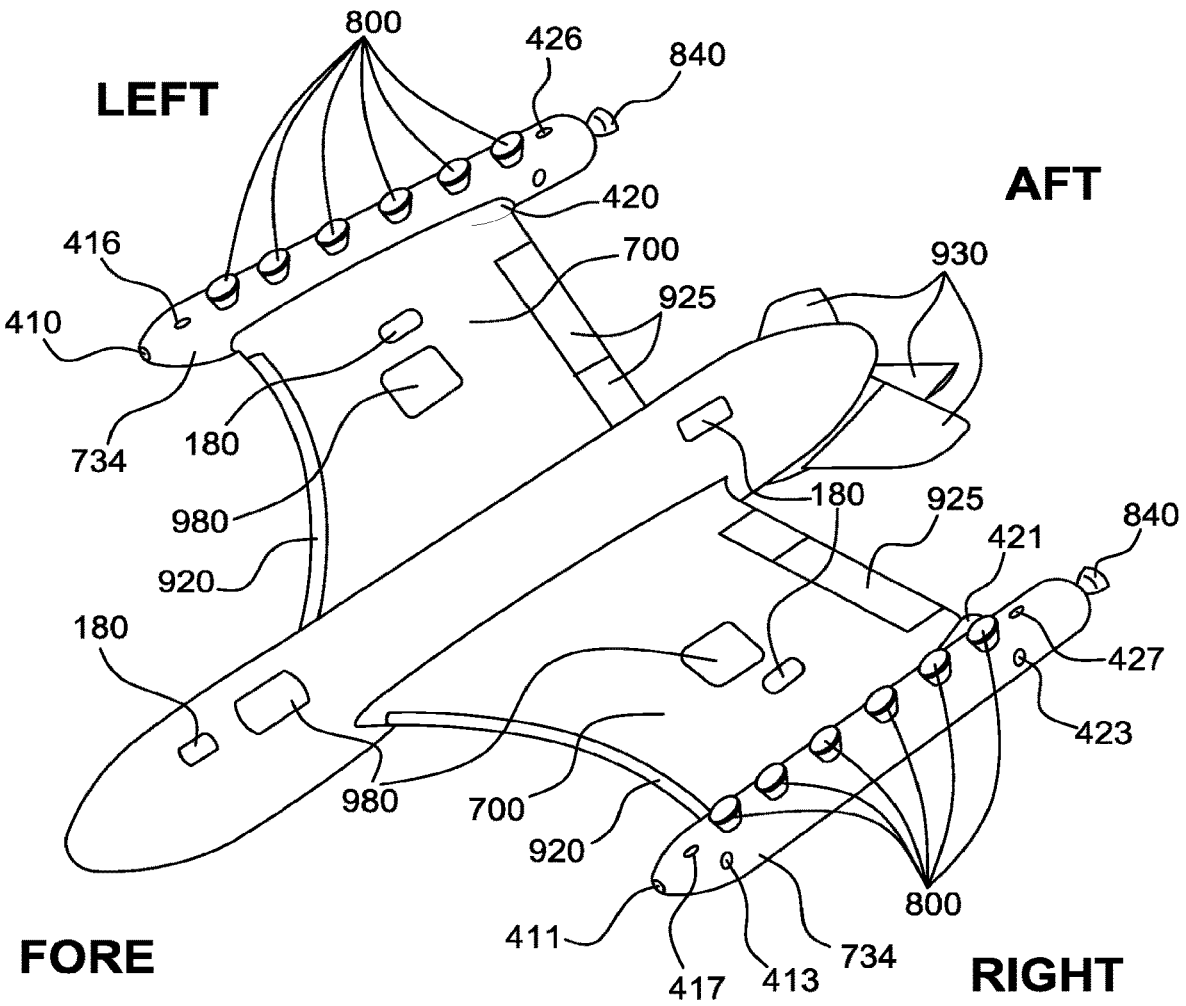
FIG. 3B shows a bottom view of an example aerospace vehicle #3.

An example non-limiting embodiment illustrated in FIG. 3A and FIG. 3B is supplied with aerodynamic features which are well-understood by those skilled in aircraft design: the radiator surfaces 700 are implemented as wings—with flaps and slats on the leading edge (920), and spoilers, flaps, ailerons, and tabs on the trailing edge (925). The empennage (tail assembly) comprises a conventional rudder, stabilizer, elevators, and tabs (930).

The undercarriage features extensible, telescoping, struts (180) suitable for resting or landing vertically on somewhat uneven terrain, as well as conventional wheeled landing gear assemblies (980) which are lowered before landing and folded back into the craft after take off.

Figure 4A:
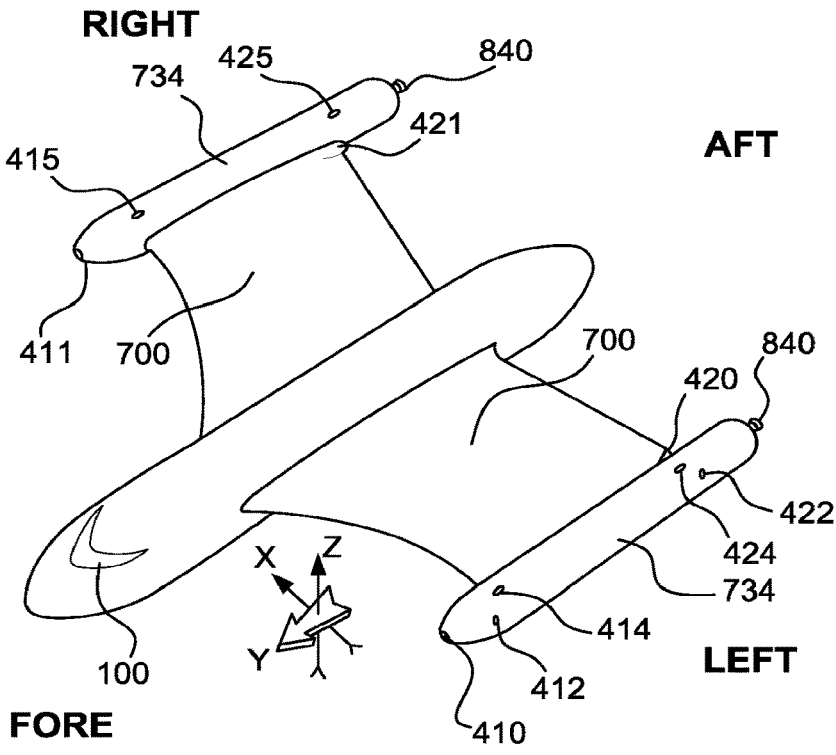
FIG. 4A shows a top view of an example aerospace vehicle #4 optimized for space.
Figure 4B:
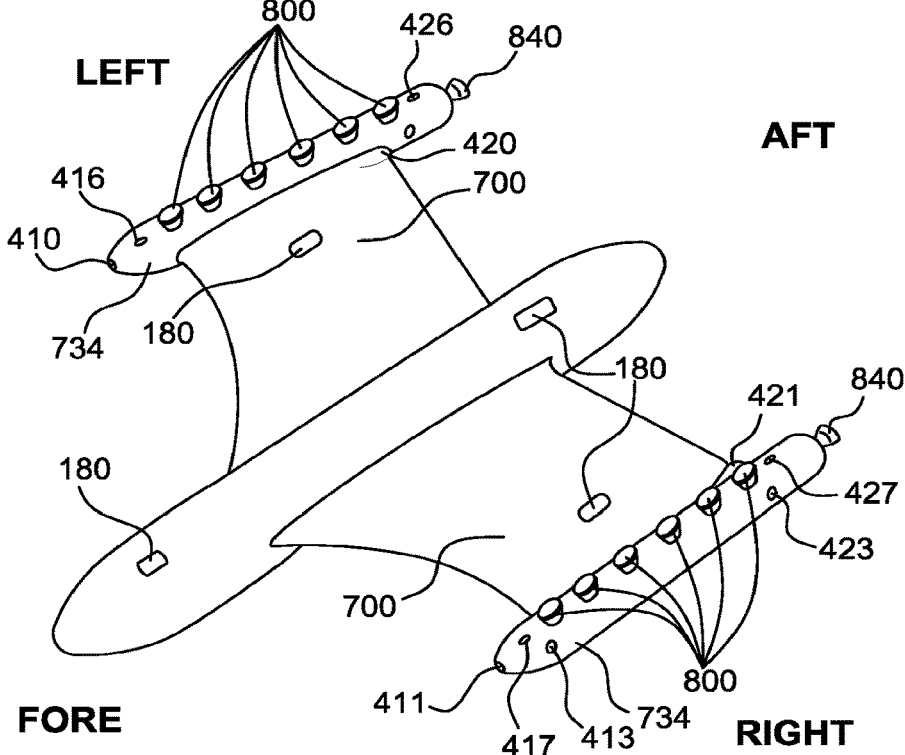
FIG. 4B shows a bottom view of an example aerospace vehicle #4 optimized for space.

Two exemplary embodiments are shown in FIG. 3A/3B (fully aero-equipped) and FIG. 4A/4B (space lean). These both exhibit 16 steering thrusters: 8 mounted Forward on the "wing" nacelles (410-417); 8 mounted Aft (420-427). Used in proper combination, these 16 alignment thrusters permit maneuvers along all axes, and provide redundancy in event of thruster failure. Because these thrusters are in some embodiments used only rarely for short bursts (typically only of a few seconds), there is no need for an elaborate and extensive heat dissipation system similar to 700.

These small thrusters can be self-contained rocket units (see INSTANTIATION ENGINE), each with their own associated NQEDs for fuel and oxidizer production—making elaborate plumbing connections from 300 unnecessary. In other exemplary embodiments these could be implemented as self-contained class III (electric) thruster units each with their own associated NQEDs for propellant (e.g., xenon) production. Power might be provided centrally from 200, or with an associated NQED (see INSTANTIATION FUEL CELL).

The diagram number assigned to each thruster can be decoded to define its location and function as follows: Consider the diagram number as the big-endian octal representation of an integer. View the low order 4 bits of this integer as "eftu" (eight, four, two, unit).

e=0 defines a thruster located Aft on a nacelle;

e=1 defines a thruster located Fore on a nacelle;

ft=00 defines a thruster that pushes fore or aft (along the Y-axis);

ft=01 defines a thruster that pushes left or right (along the X-axis);

ft=10 defines a thruster located on the Top side of a nacelle (pushes Down along Z-axis);

ft=11 defines a thruster located on the Bottom side of a nacelle (pushes Up along Z-axis);

u=0 defines a thruster located on the Left nacelle;

u=1 defines a thruster located on the Right nacelle

Used in proper combination, these 16 steering (alignment) thrusters enable maneuvers along all axes, and provide redundancy in event of thruster failure. Basic maneuvers include, for example:

to turn or yaw left, activate: 413 and/or 422 [0010]

to roll counter clockwise (CCW), activate; 414 [1100], 417 [1111], and/or 424 [0100], 427 [0111]

to pitch up, activate: 416 [1110], 417 [1111] and/or 424 [0100], 425 [0101]

to pitch down, activate: 426 [0110], 427 [0111] and/or 414 [1100], 415 [1101]

to shift right, activate; 412 [1010] and 422 [0010]

to shift forward, activate; 420 [0000] and 421 [0001]

to shift backward, activate: 410 [1000] and 411 [1001]

to shift (nudge) down, activate: 414 [1100], 415 [1101], 424 [0100], and 425 [0101]

to shift (nudge) up, activate: 416 [1110], 417 [1111], 426 [0110], and 427 [0111]

Shift operations are probably best suited for delicate maneuvers such as landing, docking, and avoiding obstacles while hovering and moving slowly. For space-tailored embodiments, which may lack pusher engines, reasonable forward motion in the atmosphere (or under any gravity influence) can be achieved by pitching down slightly, helicopter-like, and vectoring some lifter force into forward motion. Backward motion and braking is conversely achieved by pitching up slightly.

Inasmuch as "aircraft" and "spacecraft" embodiments are each fundamentally capable of operating within and beyond the atmosphere—the distinction between them is chiefly a matter of optimization. For aircraft/aerodynamic operation, the body of the craft is aerodynamically designed to facilitate high horizontal velocity through an atmosphere. For space operation, where air friction and lift are not factors, aerodynamic design is largely irrelevant. For spacecraft operation, the craft must be designed to withstand the vacuum, the radiation, and other inhospitalities of space.

Lift

For example, in spacecraft mode or operation, lift is achieved with lifting thrusters. In aircraft mode or operation, at low horizontal speed, lift can also be achieved with lifting thrusters; in an atmosphere at high or other horizontal speed, lift can be achieved aerodynamically with wings—for which behavior at horizontal speed is well understood—rather than depending on lifting thrusters which may be functionally impaired by the apparent wind generated at high horizontal velocity through an atmosphere.

Steering

In spacecraft mode or operation, steering is achieved with steering thrusters. In aircraft mode or operation, at low horizontal speed, steering can also be achieved with steering thrusters; at high horizontal speed, steering can be achieved using aerodynamic control surfaces such as ailerons, flaps, stabilizers, spoilers, rudders, elevators, and tail—rather than depending on steering thrusters which may be functionally impaired by the apparent wind generated at high horizontal velocity through an atmosphere.

Ascent & Descent

In aircraft mode or operation, ascent can be achieved by lift developed while accelerating down a runway; descent by gliding down a runway and losing lift while decelerating.

This entails landing gear with wheels and sturdy tires.

In either spacecraft or aircraft mode, ascent can be achieved with lifting thrusters operating at more than "one-G"; descent with lifting thrusters carefully operated at near to, but less than, "one-G". This entails using "struts" as landing gear (since hot billowing lifter exhaust is apt to damage tires). Extensible struts are generally better suited to variable or uneven terrain.

In spacecraft mode or operation, the high-powered lifting thrusters, which are directed downward, are apt to be objectionably noisy especially when used over populated areas in aircraft mode or operation, noise is apt to be comparable with conventional jet aircraft.

As a spacecraft, transit is generally presumed to be done primarily vertically by the lifters operating at as high an acceleration as engineering constraints, and the comfort of passengers (if any), permit. As an aircraft, transit is generally presumed to be done primarily horizontally by pushers—while the vehicle is held aloft either by lift thrusters or by aerodynamic lift generated by the wings.

Embodiments designed primarily for use in space, or which do not require high lateral velocity in an atmosphere, may elect (in the interest of reducing mass) to not implement the pusher engines, or aerodynamic features such as a tail (empennage), various control surfaces (flaps and other airfoils or aerodynamic control surfaces), and the landing wheel assemblies.

Spacecraft features should function in atmospheric operation—with the caveat that high forward speeds create crosswind that may impair operation of the lift and steering thrusters if they are of Class I (chemical type), which would thereby require operation in aircraft mode; and also with the caveat that most Class III (electric) thrusters available at the present time cannot operate effectively in the atmosphere. The exemplary embodiments herein discussed allow spacecraft features to be activated and deactivated during aircraft operation at any reasonable speed. Note that example implementations do not require aircraft features. Spacecraft-only implementation will function perfectly well in the atmosphere—provided forward speed is kept sufficiently low. Thus, lifters can be used anytime for vertical take off and landing (VTOL). Caution should be taken by designers and operators of embodiments with aircraft features to ensure that landing-gear tires are not damaged by the hot rocket exhaust of lifters during VTOL operation. Some advantages of aerodynamic operation as an aircraft (versus non-aerodynamic operation as a spacecraft) include:

concern that the cross wind at high forward speeds might interfere with effectiveness of downward directed lift rockets and the orthogonally directed steering thrusters; whereas aerodynamic lift and steering behavior of conventional aircraft at high forward speeds is well understood.

as a failsafe in event the lift thrusters fail for possible noise abatement. The noise produced by the powerful downward directed lift thrusters might be unacceptable over inhabited areas.

Our disclosures of various example preferred embodiments primarily discuss issues of spacecraft design which are particularly affected by, or are relevant to, the novel aspects of this technology. For the most part we omit conventional aspects and details of implementation which (although undoubtedly important for inclusion into practical implementations) can be readily identified and implemented by anyone, or any team, skilled in the art of spacecraft design. A very incomplete list of what we omit, or only briefly mention, includes for example and without limitation: entry portals, life support systems, recycling, guidance, control, communication, protection against hazards (such as radiation shielding), wiring, plumbing, safety, redundancy, and security.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A long range vehicle comprising:
a transport shell;
a propulsor disposed in or on the shell; and
at least one Nagel Quantum Effect Device (NQED) operatively coupled to the propulsor, the at least one NQED providing imprinted material to the propulsor.

2. The vehicle of claim 1 wherein the propulsor consumes material produced by the at least one NQED as fuel.

3. The vehicle of claim 2 further comprising an atmospheric chamber in or on the shell that consumes material produced by at least one NQED.

4. The vehicle of claim 2 further comprising a power system that consumes material produced by the at least one NQED.

5. The vehicle of claim 2 wherein the propulsor consumes material produced by the at least one NQED as propellant.

6. The vehicle of claim 2 wherein the propulsor consumes material produced by the at least one NQED as an oxidizing agent.

7. An aerospace vehicle comprising:
a vehicle structure; and
at least one Nagel Quantum Effect Device (NQED) supplying a consumable to the vehicle structure.

8. The vehicle of claim 7 further comprising a propulsion system disposed in or on the vehicle structure that consumes material produced by the at least one NQED as fuel.

9. The vehicle of claim 7 further comprising an atmospheric chamber in or on the vehicle structure that consumes material produced by the at least one NQED.

10. The vehicle of claim 7 further comprising a power system in or on the vehicle structure that consumes material produced by the at least one NQED.

11. The vehicle of claim 7 further comprising a propulsion system in or on the vehicle structure that consumes material produced by the at least one NQED as propellant.

12. The vehicle of claim 7 further comprising a propulsion system in or on the vehicle structure that consumes material produced by the at least one NQED as an oxidizing agent.

13. A craft comprising:
a flight control computer,
a thruster control computer operatively coupled to the flight control computer,
at least one thruster operatively coupled to the thruster control computer, and
at least one Nagel Quantum Effect Device (NQED) coupled to feed fuel and/or oxidizer to the at least one thruster.

14. The craft of claim 13 wherein the at least one thruster comprises:
at least one propulsion thruster, and
an array of navigation thrusters.

15. The craft of claim 13 further comprising:
a further NQED, and
an environmental control system coupled to the further NQED.

16. The craft of claim 13 further comprising;
a further NQED, and
a thermal device coupled to the further NQED.

17. The craft of claim 13 further comprising at least one thermal radiator.

18. The craft of claim 13 further comprising a payload including an enclosure for supporting human life.

19. The craft of claim 13 wherein the thruster comprises thruster selected from the group consisting of a chemical thruster, a nuclear thruster, and an electrical thruster.

20. The craft of claim 13 further including wings that generate lift in air.

21. A craft comprising:
a flight control computer,
a thruster control computer operatively coupled to the flight control computer,
at least one thruster operatively coupled to the thruster control computer, and
at least one Nagel Quantum Effect Device (NQED) coupled to supply propellant for the at least one thruster.

22. The craft of claim 21 wherein the at least one NQED is connected to a storage tank, and the storage tank is configured to selectively supply the propellant to the at least one thruster.

* * * * *